US011852507B2

(12) United States Patent
Tombez et al.

(10) Patent No.: US 11,852,507 B2
(45) Date of Patent: Dec. 26, 2023

(54) MAGNETIC POSITION SENSOR DEVICE, METHOD AND SYSTEM, WITH ERROR DETECTION

(71) Applicant: Melexis Technologies SA, Bevaix (CH)

(72) Inventors: Lionel Tombez, Bevaix (CH); Yves Bidaux, Bevaix (CH); Gael Close, Bevaix (CH)

(73) Assignee: MELEXIS TECHNOLOGIES SA, Bevaix (CH)

( * ) Notice: Subject to any disclaimer, the term of this patent is extended or adjusted under 35 U.S.C. 154(b) by 0 days.

(21) Appl. No.: 18/090,123

(22) Filed: Dec. 28, 2022

(65) Prior Publication Data

US 2023/0213357 A1    Jul. 6, 2023

(30) Foreign Application Priority Data

Dec. 31, 2021 (EP) .................................. 21218508

(51) Int. Cl.
*G01D 5/14* (2006.01)
*G01B 7/30* (2006.01)

(52) U.S. Cl.
CPC ............... *G01D 5/145* (2013.01); *G01B 7/30* (2013.01)

(58) Field of Classification Search
CPC .................................. G01D 5/145; G01B 7/30
See application file for complete search history.

(56) References Cited

U.S. PATENT DOCUMENTS

| 8,878,524 | B2 | 11/2014 | Herberle |
| 11,255,699 | B2 * | 2/2022 | Hammerschmidt ...... G01D 3/08 |
| 11,371,862 | B2 * | 6/2022 | Dupre .................... G01D 3/036 |
| 2013/0099777 | A1 | 4/2013 | Herberle |

FOREIGN PATENT DOCUMENTS

| EP | 2584304 A1 | 4/2013 |
| EP | 3742129 A1 | 11/2020 |
| EP | 3742130 A1 | 11/2020 |
| EP | 3783316 A1 | 2/2021 |
| EP | 3885778 A1 | 9/2021 |

OTHER PUBLICATIONS

Extended European Search Report from European Patent Application No. EP 21218508.6, dated Jun. 15, 2022.

* cited by examiner

*Primary Examiner* — Reena Aurora
(74) *Attorney, Agent, or Firm* — Workman Nydegger

(57) ABSTRACT

A position sensor device includes: a first, second and third magnetic sensor for measuring a first magnetic field component oriented in the first direction, and a second magnetic field component oriented in a second direction perpendicular to the first direction; a processing circuit for determining a first and a second difference of signals provided by the first and third sensor, and for determining and outputting a first angle based on these differences; and for determining a third and a fourth difference of signals provided by the second sensor and one of the first and the third sensor; and for determining a second angle based on the third and the fourth difference, and for outputting the second angle and/or a diagnostic signal based on a comparison of the first and second angle.

20 Claims, 11 Drawing Sheets

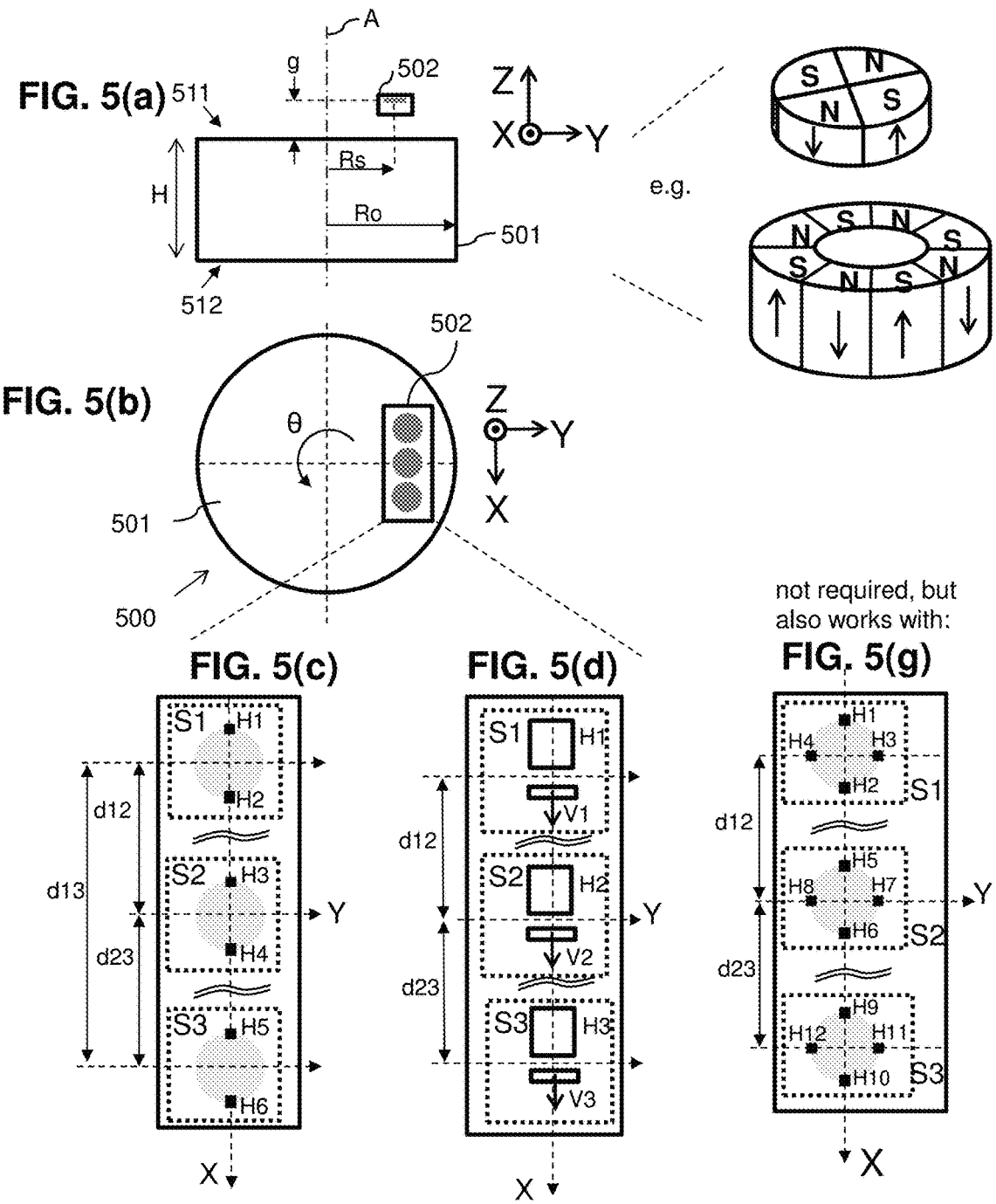

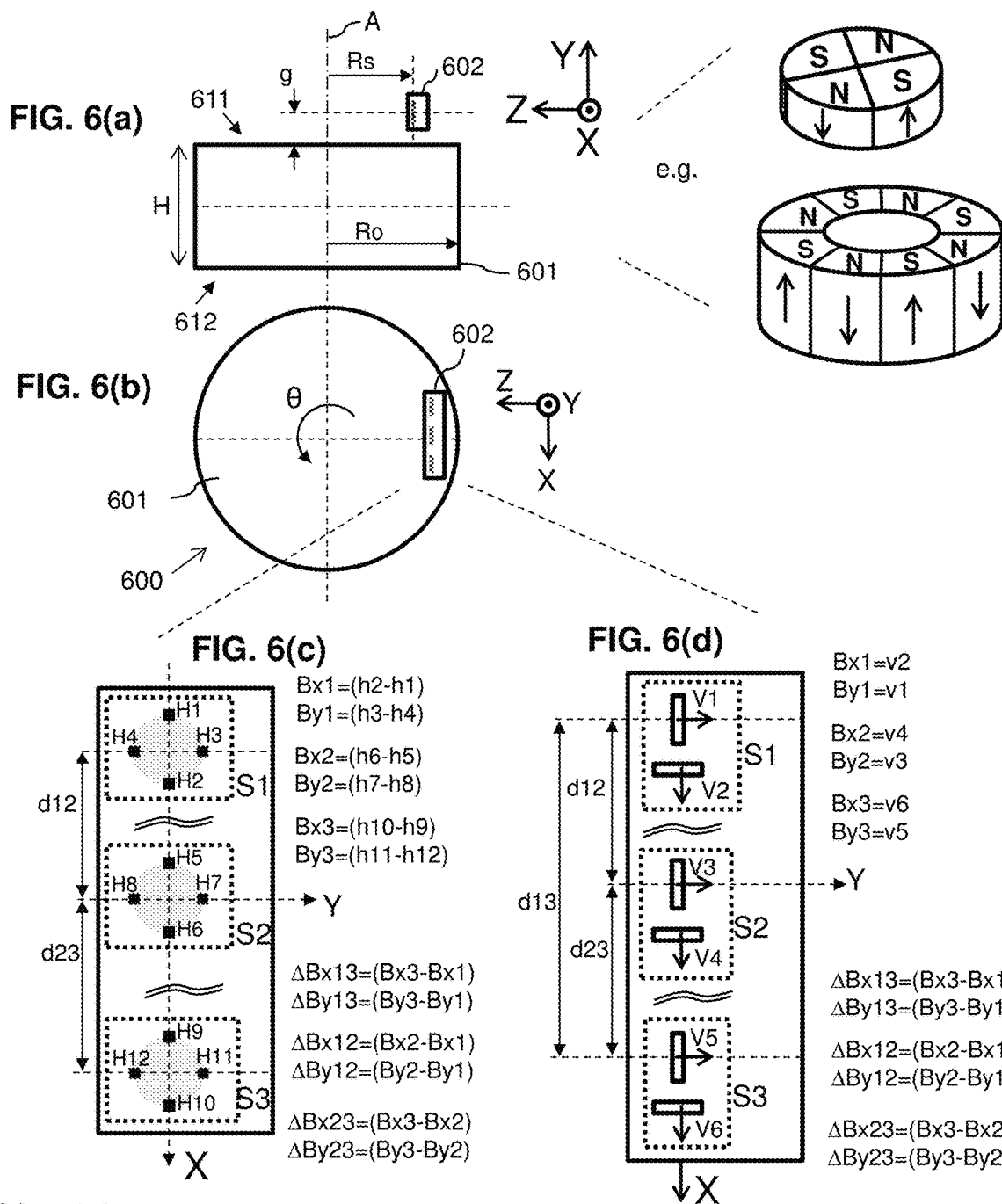

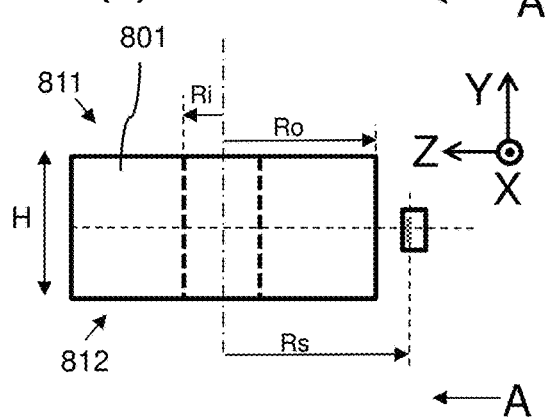
FIG. 8(a)
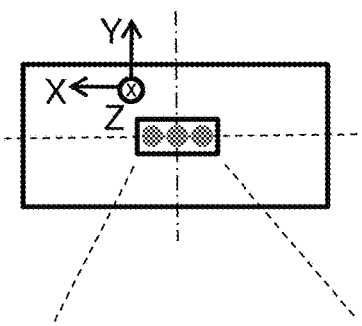
FIG. 8(c)
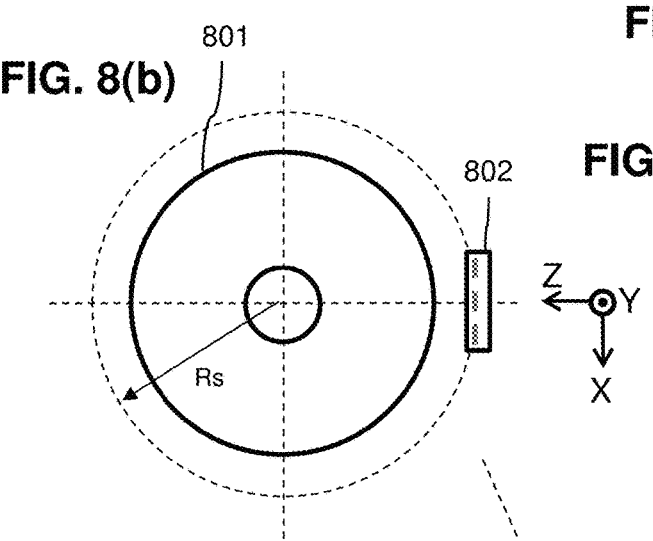
FIG. 8(b)
FIG. 8(d)
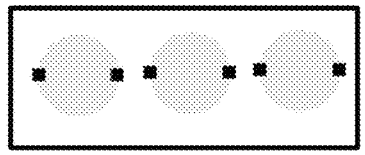
FIG. 8(e)
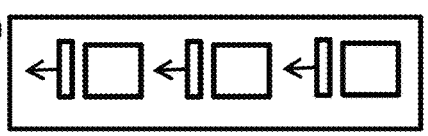
not required, but also works with:
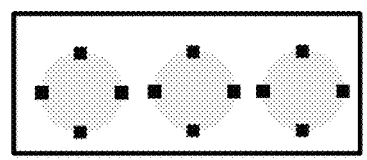
FIG. 8(f)
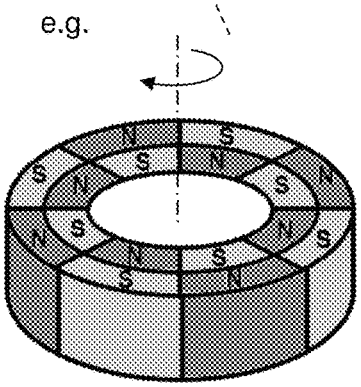

not required, but also works with:

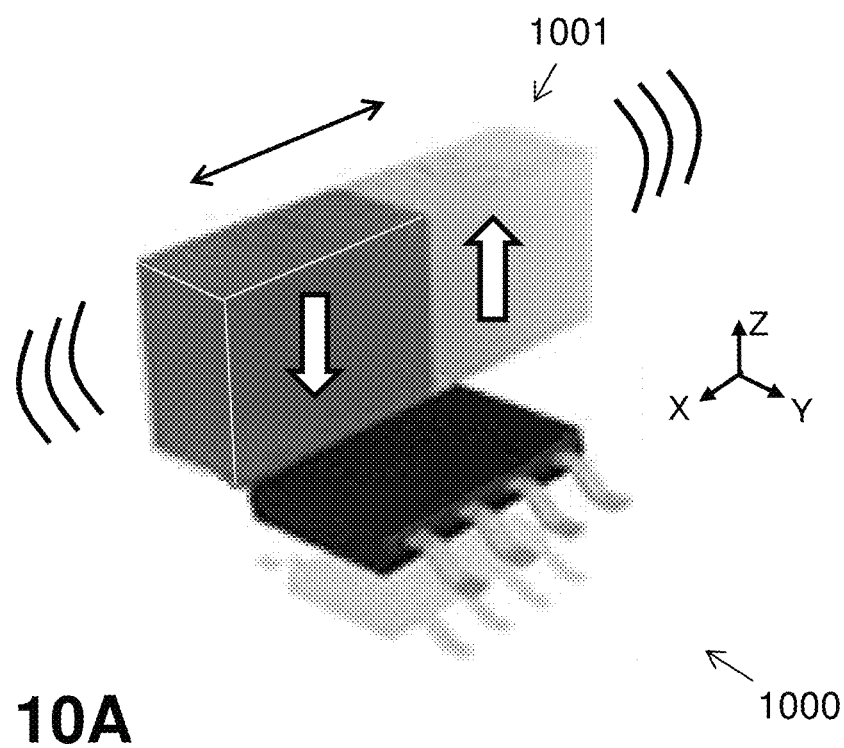
FIG. 10A
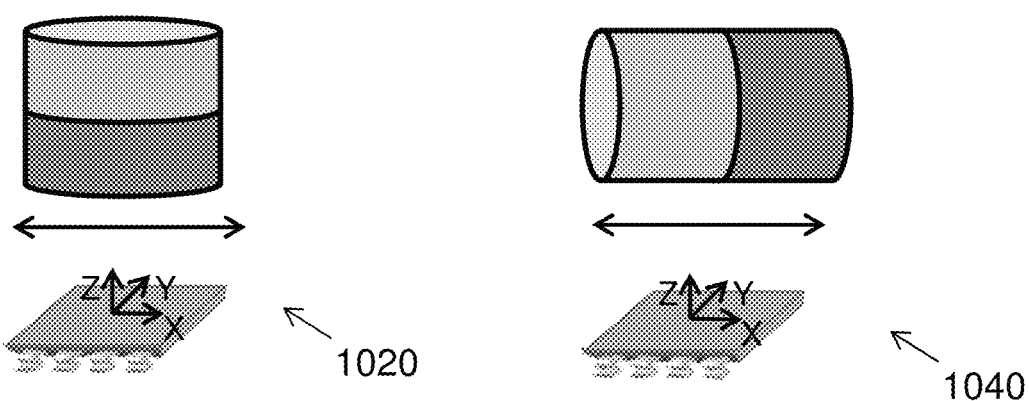
FIG. 10B  FIG. 10C

MAGNETIC POSITION SENSOR DEVICE, METHOD AND SYSTEM, WITH ERROR DETECTION

FIELD OF THE INVENTION

The present invention relates in general to the field of magnetic position sensor systems, devices and methods, and more in particular to linear and/or angular magnetic position sensor systems and devices with error detection capabilities, and methods of determining a linear or angular position and detecting if an error has occurred.

BACKGROUND OF THE INVENTION

Magnetic sensor systems, in particular linear or angular position sensor systems are known in the art. They offer the advantage of being able to measure a linear or angular position without making physical contact, thus avoiding problems of mechanical wear, scratches, friction, etc.

Many variants of position sensor systems exist, addressing one or more of the following requirements: using a simple or cheap magnetic structure, using a simple or cheap sensor device, being able to measure over a relatively large range, being able to measure with great accuracy, requiring only simple arithmetic, being able to measure at high speed, being highly robust against mounting errors, being highly robust against an external disturbance field, providing redundancy, being able to detect an error, being able to detect and correct an error, having a good signal-to-noise ratio (SNR), etc.

Often two or more of these requirements conflict with each other, hence a trade-off needs to be made.

EP3783316(A1) discloses magnetic position sensor systems comprising a magnet or a magnetic structure, and a sensor device movably mounted relative to said magnet or magnetic structure. The systems described in this document, however, do not have error detection capabilities.

There is always room for improvements or alternatives.

SUMMARY OF THE INVENTION

It is an object of embodiments of the present invention to provide a magnetic position sensor system capable of determining a position of a sensor device relative to a magnet or a magnetic structure, and capable of detecting an error, (e.g. an error related to a defective sensor or transducer).

It is also an object of embodiments of the present invention to provide a sensor device specifically adapted for use in such a system.

It is also an object of embodiments of the present invention to provide a method of determining a position of a sensor device relative to a magnet or a magnetic structure, and to provide additional information indicative of an error, and/or allowing the detection of an error by another processor connected to the sensor device.

It is an object of embodiments of the present invention to provide such a system, device and method, wherein the position is determined in a manner which is highly insensitive to an external disturbance field (also known as "stray field"), and wherein also the error detection is highly insensitive to an external disturbance field.

It is an object of embodiments of the present invention to provide such an integrated circuit, having a reduced area (e.g. a smaller size of the silicon chip), without decreasing the accuracy of the measured position.

These and other objectives are accomplished by embodiments of the present invention.

According to a first aspect, the present invention provides a position sensor device comprising:
- a substrate comprising a first, a second and a third magnetic sensor (e.g. S1, S2, S3) spaced apart in a first direction (e.g. X), each magnetic sensor capable of measuring at least a first magnetic field component (e.g. Bx) oriented in the first direction (e.g. X), and a second magnetic field component (e.g. Bz) oriented in a second direction (e.g. Y; Z) perpendicular to the first direction;
- a processing circuit connected to said magnetic sensors (e.g. S1, S2, S3), and configured for:
  a) determining (e.g. calculating) a first difference (e.g. ΔBx13) between the first magnetic field components (e.g. Bx1, Bx3) provided by the first and the third sensor (e.g. S1, S3), and configured for determining a second difference (e.g. ΔBz13) between the second magnetic field components (e.g. Bz1, Bz3) provided by the first and the third sensor (e.g. S1, S3), and for calculating a first angle (e.g. θmain) based on a ratio of the first difference (e.g. ΔBx13) and the second difference (e.g. ΔBz13), and for outputting the first angle (e.g. θmain);
  b) and for determining (e.g. calculating) a third difference (e.g. ΔBx12) between the first magnetic field component (e.g. Bx2) provided by the second sensor (e.g. S2) and the first magnetic field component (e.g. Bx1) provided by one (e.g. S1) of the first and the third sensor;
  c) and for determining (e.g. calculating) a fourth difference (e.g. ΔBz12) between the second magnetic field component (e.g. Bz2) provided by the second sensor (e.g. S2) and the second magnetic field component (e.g. Bz1) provided by said one (e.g. S1) of the first and the third sensor;
  d) and for determining (e.g. calculating) a second angle (e.g. θaux12; θaux3) based on the third and the fourth difference (e.g. ΔBx12, ΔBz12), and for outputting said second angle (e.g. θaux12; θaux3) and/or a diagnostic signal derived from a comparison of the first angle (e.g. θmain) and said second angle (e.g. θaux12; θaux3) or a value derived therefrom.

In other words, signals from the first and third sensor (S1 and S3) are used for calculating the first and the second difference; and signals from the second sensor (S2) and either the first or the third sensor, are used for calculating the third and the fourth difference.

It is a major advantage of this embodiment that both the first angle (also referred to herein as "main angle") as well as the second angle (also referred to herein as "auxiliary angle") is calculated based on difference signals (or gradients), because these difference signals are highly robust against an external magnetic disturbance field.

It is a major advantage of this embodiment that the first angle is calculated based on a ratio of two difference signals (or gradients), because this ratio is highly robust against temperature variations, demagnetization effects, the distance between the magnet and the sensor device.

It is a major advantage of this embodiment that it offers the ability of error detection, without doubling the number of magnetic sensor elements, thus without doubling the footprint occupied by these sensor elements.

It is a major advantage of embodiments wherein the sensors comprise an integrated magnetic concentrator, that the space occupied by IMC is not doubled, but only increased by 50%, because doubling may have a negative impact on the methods of producing such a device, in particular on the time required for electroplating, and/or on the yield.

In an embodiment, the first angle may be calculated in accordance with the following formula: $\theta main = atan2(\Delta Bx13, \Delta Bz13)$, where $\theta main$ is the first angle, $\Delta Bx13$ is the first difference, and $\Delta Bz13$ is the second difference.

In an embodiment, the position sensor device comprises only three magnetic sensors, namely said first, second and third magnetic sensor (e.g. S1, S2, S3).

It is an advantage of this embodiment that it only requires three sensor locations, thus requires less substrate area (e.g. silicon area), as compared to a sensor device comprising four sensors spaced apart in the X-direction.

In an embodiment, the first, second and third sensor are located on a straight line.

In an embodiment, the first, second and third sensor are located at the corners of a triangle.

In an embodiment, the first, second and third sensor are located on a straight line, and the first sensor (e.g. S1) and the third sensor (e.g. S3) are spaced apart by 1.0 to 3.0 mm, or by 1.25 to 2.75 mm, or by 1.5 to 2.5 mm; and the second sensor (e.g. S2) is situated between the first (e.g. S1) and the third sensor (e.g. S3).

The second sensor may be located at a distance of at least 0.3 mm, or at least 0.4 mm from the first and the third sensor.

As an example, the first sensor may be located at X1=0.0 mm, the second sensor may be located at X2=0.4 mm, and the third sensor may be located at X3=2.5 mm. It should come as a surprise that the distance between the first and the second sensor location can be as small as 0.3 mm or 0.4 mm, especially if each of these sensors comprises an integrated magnetic concentrator having a diameter of about 150 to 250 microns, that bends the field lines in the vicinity of the IMC.

In an embodiment, the first, second and third sensor are located at the corners of a triangle. In a particular embodiment, the triangle has a base, and a height perpendicular to the base, and a ratio of the height over the base (H/B) is smaller than 20%. In another or a further embodiment, the base has a length in the range from 1.0 to 3.0 mm, or from 1.25 to 2.75 mm, or from 1.5 to 2.5 mm; and has a height smaller than 0.5 mm, or smaller than 0.4 mm, or smaller than 0.3 mm, and the first and the third sensor (S1, S3) are located on the base.

In an embodiment, the substrate is a semiconductor substrate. Preferably the first, second and third sensor are integrated in the semiconductor substrate.

In an embodiment, the processing circuit is configured for calculating the second angle based on a (second) ratio (e.g. R2) of the third difference and the fourth difference.

It is a major advantage of this embodiment that both the first angle as well as the second angle is calculated based on a ratio of two difference signals (or gradients), because this ratio is highly robust against temperature variations, demagnetization effects, distance between the magnet and the sensor device, and thus reduces to mounting tolerances.

It is noted that in this embodiment, it is not absolutely required to compute a second angle, and to compare the first and second angle, but it suffices to compare the first and second ratio. The comparison of the ratios may be performed inside the sensor device or outside the sensor device. The first and second ratio may also be output for allowing an external processor to compare.

In an embodiment, each magnetic sensor is only a 2D magnetic pixel, but not a 3D magnetic pixel. This offers the advantage that each magnetic sensor comprises less magnetic sensitive elements, and thus the risk of a defect is decreased.

In an embodiment, each magnetic sensor is a 3D magnetic pixel (hardware-wise), but the readout-circuit is configured to read-out only 2 magnetic field components. This offers the advantage that an existing hardware (e.g. layout) can be (re)used. It also provides the advantage that the sensor can be readout faster (at a higher frequency).

In an embodiment, each magnetic sensor is a 3D magnetic pixel (hardware-wise), and the readout-circuit is configured to read-out 3 magnetic field components, but the processing software only uses two of these components and ignores one component. This offers the advantage that an existing hardware (e.g. layout) can be (re)used, as well as the readout-scheme, while taking benefit of the advantageous effects of the present invention.

In an embodiment, the second angle is calculated in accordance with the following formula: $\theta aux12 = atan2(\Delta Bx12, \Delta Bz12)$, where $\theta aux12$ is the second angle, $\Delta Bx12$ is the third difference, and $\Delta Bz12$ is the fourth difference.

It is an advantage of this embodiment that only two angles need to be calculated, namely $\theta main$ (based on sensor S1 and S3) and $\theta aux12$ (based on sensor S1 and S2).

In a simple implementation, the two angles $\theta main$ and $\theta aux12$ can simply be compared, and if they deviate too much, an error is detected.

In a somewhat improved implementation, the angular difference between $\theta main$ and $\theta aux12$ is measured and stored in a non-volatile memory and is taken into account in the comparison.

In this embodiment, the sensor is preferably not located in the middle between the first and the third sensor, but relatively close to either the first or the third sensor, e.g. at a distance of 0.4 to 0.6 mm from the first or third sensor.

In an embodiment, the processing circuit is further configured for calculating a fifth difference (e.g. $\Delta Bx23$) between the first magnetic field component (e.g. Bx2) provided by the second sensor (e.g. S2) and the first magnetic field component (e.g. Bx3) provided by the other one (e.g. S3) of the first and the third sensor; and wherein the processing circuit is further configured for calculating a sixth difference (e.g. $\Delta Bz23$) between the second magnetic field component (e.g. Bz2) provided by the second sensor (e.g. S2) and the second magnetic field component (e.g. Bz3) provided by said other one (e.g. S3) of the first and the third sensor; and wherein the processing circuit is further configured for calculating said second angle (e.g. $\theta aux3$) as a function of the third and the fourth (e.g. $\Delta Bx12, \Delta Bz12$) and the fifth and the sixth difference (e.g. $\Delta Bx23, \Delta Bz23$).

In this embodiment, the sensor is preferably located in the middle between the first and the third sensor.

In an embodiment, the second angle may be calculated as a linear combination, e.g. an average or a weighted average of an angle $\theta aux12$ and an angle $\theta aux23$, wherein $\theta aux12$ is calculated as: $\theta aux12 = atan2(\Delta Bx12, \Delta Bz12)$, where $\Delta Bx12$ is the third difference, and $\Delta Bz12$ is the fourth difference, and where $\theta aux23 = atan2(\Delta Bx23, \Delta Bz23)$, where $\Delta Bx23$ is the fifth difference, and $\Delta Bz23$ is the sixth difference.

In an embodiment, the second angle may be calculated in accordance with the following formula: $\theta aux3 = atan2[(\Delta Bx23 - \Delta Bx12), (\Delta Bz23 - \Delta Bz12)]$, where $\Delta Bx12$ is the third difference, $\Delta Bz12$ is the fourth difference, $\Delta Bx23$ is the fifth difference, and $\Delta Bz23$ is the sixth difference.

In an embodiment, the first, second and third sensor are located on a straight line, and the second sensor (e.g. S2) is situated in the middle between the first (e.g. S1) and the third sensor (e.g. S3).

It is an advantage of this embodiment that it provides the same accuracy (for the main angle) as a position sensor device having only the first and the third sensor, but not the one in between; but additionally offers the benefit of error-detection. In particular, this embodiment allows to calculate three angles in a strayfield-immune manner, and the main angle (with high accuracy) should be equal to the average of the two other angles (with slightly lower accuracy, because of the reduced distance Δx).

It is noted, however, that the invention will also work if the second sensor is not located exactly in the middle between the first and the third sensor, but for example at a distance which is equal to about 30% to 45% of the distance between the first and the third sensor. In this case, the main angle should still be a value between the first auxiliary angle (derived from the signals obtained from S1 and S2), and a second auxiliary angle (derived from the signals obtained from S2 and S3), assuming they are sufficiently accurate, but the main angle should be equal to a weighted average of the first and second auxiliary angle. The weighting factors depend on the relative position of the second sensor.

In an embodiment, each of the first, second and third sensor (e.g. S1, S2, S3) comprises an integrated magnetic concentrator (e.g. IMC1, IMC2, IMC3) and two horizontal Hall element arranged on opposite sides of the IMC.

In some of these embodiments, the position sensor device comprises three IMC with only two horizontal Hall elements each, thus only six horizontal Hall elements in total, e.g. as illustrated in FIG. 5(c), FIG. 6(c), FIG. 7(c), FIG. 8(c), FIG. 9(d), FIG. 10(b). It is an advantage of this embodiment that it only requires six sensor elements. It is an advantage that the sensor device comprises three identical sensors (same layout, only shifted).

In an embodiment, each of the first, second and third sensor (e.g. S1, S2, S3) comprises a horizontal Hall element and a vertical Hall element.

In an embodiment, each of the first, second and third sensor (e.g. S1, S2, S3) comprises a horizontal Hall element and a pair of vertical Hall element located on opposite sides of the horizontal Hall element.

Examples are illustrated in FIG. 5(d), FIG. 6(d), FIG. 7(d), FIG. 9(f), FIG. 10(c). It is an advantage of this embodiment that it requires only six or only nine sensor elements.

In case the sensor comprises a pair of vertical Hall elements, the signals from the pair can be compared to see if they match in order to determine an error, and if no error is found, the signals can be added (summed) to improve the signal-to-noise ratio, and thus the accuracy.

In an embodiment, each of the first, second and third sensor (e.g. S1, S2, S3) comprises two vertical Hall elements, having direction of maximum sensitivity which are perpendicular to each other.

In an embodiment, each of the first, second and third sensor (e.g. S1, S2, S3) comprises two pairs of vertical Hall elements, arranged around a virtual square.

Preferably in this case, the position sensor device does not comprise integrated magnetic concentrators.

An example of a sensor device comprising sensors, each sensor comprising only two vertical Hall element is shown in FIG. 8(e) and FIG. 9(e). It is an advantage of this embodiment that diagnostic functionality is provided by adding only two sensor elements (not four).

In case the sensor comprises two pairs of vertical Hall elements, the signals from the elements within of pair can be compared to see if they match in order to determine an error, and if no error is found, the signals can be added (summed) to improve the signal-to-noise ratio (SNR), and thus the accuracy. It is an advantage of this embodiment that error detection can be provided, and that the SNR can be improved.

In an embodiment, each of the first and the third sensor (e.g. S1, S3) comprise an integrated magnetic concentrator and four horizontal Hall element angularly spaced by multiples of 90°, consisting of a first and a second Hall element being spaced apart along the first direction (e.g. X), and a third and a fourth Hall element spaced apart in a direction perpendicular to the first direction; wherein the first angle (e.g. θmain) is calculated based on signals obtained from the first and the second Hall element; and wherein the sensor device is further configured to determine a first sum (e.g. sum1) as a sum of the signals obtained from the first and the second Hall element, and to calculate a second sum (e.g. sum2) as a sum of the signals obtained from the third and the fourth Hall element, and to take into account a match of the first sum and the second sum when determining the diagnostic signal.

Or stated in simple terms, in this embodiment, a first sum of the signals of the Hall elements located on the X-axis, and a second sum of the Hall elements located on the Y-axis are compared, and a mismatch of the first and second sum is considered as an indication of an error detection.

It is an advantage of this embodiment that the third and fourth Hall elements are not actually used for determining the angular position and does not significantly increase the layout of the sensor, or the readout of the sensor elements, yet can advantageously be used to detect an error of, or related to the first and the second Hall element. In other words, the fault coverage is increased.

In an embodiment, the first and the third sensor each have an IMC and four Horizontal Hall elements, while the second sensor has an IMC with only two horizontal Hall elements, and the "test with the first and the second sum" is performed only on the first and the third sensor.

In an embodiment, each of the first, the second and the third sensor have an IMC and four Horizontal Hall elements, and the "test with the first and the second sum" is performed on all three sensors.

According to a second aspect, the present invention also provides a magnetic position sensor system comprising: a magnetic source for generating a magnetic field having at least two poles; and a position sensor device according to the first aspect, movable relative to said magnetic source, or vice versa.

In an embodiment, the magnetic source is a permanent magnet, rotatable about a rotation axis; and the position sensor device is mounted at a nonzero radial distance (e.g. Rs) from the rotation axis, and is oriented such that the first direction (e.g. X) is tangential to an imaginary circle having a centre on the rotation axis.

Such a position sensor system is commonly referred to as "angular position sensor system".

The magnet may be an axially or diametrically or radially magnetised ring magnet or disk magnet, more in particular, an axially or diametrically two-pole ring or disk magnet, or an axially or radially magnetized ring or disk magnet having more than two poles, for example at least four poles or at least six poles, or at least eight poles.

The magnet may be an axially or diametrically magnetized two-pole ring or disk magnet.

The magnet may be an axially magnetized ring or disk magnet having a plurality of at least four poles, or at least six poles, or at least eight poles.

The magnet may be a radially magnetized ring having a plurality of at least four poles, or at least six poles, or at least eight poles.

In an embodiment, the substrate of the sensor device is oriented perpendicular to the rotation axis, and the magnet has an outer radius (e.g. Ro), and a geometric center of the sensors (e.g. S1, S2, S3) of the sensor device are located at a radial position (e.g. Rs) of 30% to 95% of the outer radius (e.g. Ro), or 30% to 90%, or 30% to 85%, or 30% to 80%, and at an axial position above a top surface or below a bottom surface of the magnet, e.g. as shown in FIG. 6(a).

In an embodiment, the substrate of the sensor device is oriented parallel to the rotation axis, and the magnet has an outer radius (e.g. Ro), and a geometric center of the sensors (e.g. S1, S2, S3) of the sensor device are located at a radial position (e.g. Rs) of 30% to 95% of the outer radius (e.g. Ro), or 30% to 90%, or 30% to 85%, or 30% to 80%, and at an axial position above a top surface or below a bottom surface of the magnet, e.g. as shown in FIG. 7(a).

In an embodiment, the substrate of the sensor device is oriented perpendicular to the rotation axis, and the magnet has an outer radius (e.g. Ro), and a geometric center of the sensors (e.g. S1, S2, S3) of the sensor device are located at a radial position (e.g. Rs) of 105% to 200% of the outer radius (e.g. Ro), or 105% to 175%, or 105% to 150%, or 110% to 150%, and at an axial position substantially inside the bottom surface or inside the top surface, or at an axial position between the bottom surface and the top surface, e.g. at an axial position substantially in the middle between the top and bottom surface, e.g. as shown in FIG. 8(a).

In an embodiment, the substrate of the sensor device is oriented parallel to the rotation axis, and the magnet has an outer radius (e.g. Ro), and a geometric center of the sensors (e.g. S1, S2, S3) of the sensor device are located at a radial position (e.g. Rs) of 105% to 200% of the outer radius (e.g. Ro), or 105% to 175%, or 105% to 150%, or 110% to 150%, and at an axial position substantially inside the bottom surface or inside the top surface, or at an axial position between the bottom surface and the top surface, e.g. at an axial position substantially in the middle between the top and bottom surface, e.g. as shown in FIG. 8(a).

In an embodiment, the substrate of the sensor device is oriented perpendicular to the rotation axis, and the magnet has an outer radius (e.g. Ro), and a geometric center of the sensors (e.g. S1, S2, S3) of the sensor device are located at a radial position (e.g. Rs) of 105% to 200% of the outer radius (e.g. Ro), or 105% to 175%, or 105% to 150%, or 110% to 150%, and at an axial position above a top surface or below a bottom surface of the magnet (not explicitly shown).

In an embodiment, the substrate of the sensor device is oriented parallel to the rotation axis, and the magnet has an outer radius (e.g. Ro), and a geometric center of the sensors (e.g. S1, S2, S3) of the sensor device are located at a radial position (e.g. Rs) of 105% to 200% of the outer radius (e.g. Ro), or 105% to 175%, or 105% to 150%, or 110% to 150%, and at an axial position above a top surface or below a bottom surface of the magnet (not explicitly shown).

In an embodiment, the magnetic source is a two-pole magnet, or an elongated structure extending in a longitudinal direction and comprising a plurality of at least two alternating magnetic pole pairs; and the position sensor device is movable in the longitudinal direction, at a nonzero distance from the magnetic source.

Preferably the distance is substantially constant. Preferably the sensor device is oriented with its first direction (X) parallel to the longitudinal direction of the magnetic source.

Such a position sensor system is commonly referred to as "linear position sensor system". Preferably, in this case, the position sensor device is further configured for converting the first angle θ1 into a first linear position, in manners known per se in the art.

In an embodiment, the magnetic structure has a symmetry plane parallel to the orientation of the remanent magnetic field, and the first, second and third sensor of the sensor device is substantially situated in this symmetry plane.

In an embodiment, the substrate of the sensor device is oriented orthogonal to the orientation of the remanent magnetic field inside the magnetic source, and the second direction is oriented perpendicular to the substrate, e.g. as shown in FIG. 10.

In an embodiment, the substrate of the sensor device is oriented parallel to the orientation of the remanent magnetic field inside the magnetic source, and the second direction is oriented parallel to the substrate (not explicitly shown).

In an embodiment, the magnetic position sensor system further comprises a second processor (e.g. ECU) communicatively connected to the position sensor device, and configured for performing one of the following: i) receiving the first angle (e.g. θmain), and receiving the second angle (e.g. θaux12), and comparing the first and second angle to detect an error; ii) receiving the first angle (θmain), and receiving a diagnostic signal indicative of an error.

In this embodiment, the first processor and the second processor may cooperate to detect if an error has occurred, and/or to take appropriate action at system level. By performing certain functions on two different processors, the probability of detection an error may be further increased.

According to a third aspect, the present invention also provides a method of determining a linear or angular position, based on signals obtained from three magnetic sensors (e.g. S1, S2, S3), spaced apart along a first direction (e.g. X), and capable of measuring at least two orthogonal magnetic field components (e.g. Bx, Bz; e.g. Bx, By); the method comprising the following steps:
 a) determining a first and a second difference (e.g. ΔBx13, ΔBz13) of signals provided by the first and the third sensor (e.g. S1, S3);
 b) determining and outputting a first angle (e.g. θmain) based on the first and second difference, e.g. based on a first ratio of the first and second difference;
 c) determining a third and a fourth difference (e.g. ΔBx12, ΔBz12) of signals provided by the second sensor (e.g. S2) and one (e.g. S1) of the first and the third sensor; and
 d) determining a second angle (e.g. θaux12; θaux3) based on the third and the fourth difference;
 e) optionally comparing the first angle (e.g. θmain) and the second angle (e.g. θaux12; θaux3);
 f) outputting the second angle (e.g. θaux12; θaux3) and/or a diagnostic signal based on a comparison of the first and second angle.

According to a fourth aspect, the present invention provides a position sensor device comprising: a substrate comprising a first, a second and a third magnetic sensor (e.g. S1, S2, S3) spaced apart in a first direction (e.g. X), each magnetic sensor capable of measuring at least a first magnetic field component (e.g. Bx) oriented in the first direction (e.g. X), and a second magnetic field component (e.g. Bz) oriented in a second direction (e.g. Y; Z) perpendicular to the first direction;

a processing circuit connected to said magnetic sensors (e.g. S1, S2, S3), and configured for:

a) determining a first difference (e.g. ΔBx13) between the first magnetic field components (e.g. Bx1, Bx3) provided by the first and the third sensor (e.g. S1, S3), and configured for determining a second difference (e.g. ΔBz13) between the second magnetic field components (e.g. Bz1, Bz3) provided by the first and the third sensor (e.g. S1, S3), and for calculating a first ratio (R1) of the first difference (e.g. ΔBx13) and the second difference (e.g. ΔBz13), and for calculating a first angle (e.g. θmain) based on the first ratio, and for outputting the first angle (e.g. θmain);

b) and for determining a third difference (e.g. ΔBx12) between the first magnetic field component (e.g. Bx2) provided by the second sensor (e.g. S2) and the first magnetic field component (e.g. Bx1) provided by one (e.g. S1) of the first and the third sensor;

c) and for determining a fourth difference (e.g. ΔBz12) between the second magnetic field component (e.g. Bz2) provided by the second sensor (e.g. S2) and the second magnetic field component (e.g. Bz1) provided by said one (e.g. S1) of the first and the third sensor;

d) and for calculating a second ratio (e.g. R2) of the third difference and the fourth difference;

e) and for optionally determining a second angle (e.g. θaux12; θaux3) based on the second ratio (e.g. R2), optionally comparing the first angle (e.g. θmain) and the second angle (e.g. θaux12; θaux3) yielding a first outcome; optionally comparing the first ratio (e.g. R1) and the second ratio (e.g. R2) yielding a second outcome; and outputting at least one of: the second angle (e.g. θaux12; θaux3), the first and the second ratio (e.g. R1, R2), a diagnostic signal based on the first outcome and/or the second outcome.

In order to detect an error, it is not required to compute two angles, but an error can also be detected by comparing the two ratios. This comparison may be performed inside the sensor device, or outside the sensor device, e.g. in an ECU.

Similar embodiments as described above for the first aspect can also be formulated for a sensor device according to the fourth aspect.

According to a fifth aspect, the present invention provides a system comprising a sensor device according to the fourth aspect.

In an embodiment, the magnetic position sensor system further comprises a second processor (e.g. ECU) communicatively connected to the position sensor device, and configured for performing one of the following: i) receiving the first and the second angle, and comparing the first and second angle to detect an error; ii) receiving the first angle (θmain), and receiving a diagnostic signal indicative of an error; iii) receiving the first ratio and the second ratio, and comparing the first and second ratio to detect an error;

According to a sixth aspect, the present invention also provides a method of determining a linear or angular position, based on signals obtained from three magnetic sensors (e.g. S1, S2, S3), spaced apart along a first direction (e.g. X), and capable of measuring at least two orthogonal magnetic field components (e.g. Bx, Bz; e.g. Bx, By); the method comprising the following steps:

a) determining a first and a second difference (e.g. ΔBx13, ΔBz13) of signals provided by the first and the third sensor (e.g. S1, S3), and determining a first ratio (e.g. R1) of the first and second difference;

b) determining and outputting a first angle (e.g. θmain) based on the first ratio (e.g. R1);

c) determining a third and a fourth difference (e.g. ΔBx12, ΔBz12) of signals provided by the second sensor (e.g. S2) and one (e.g. S1) of the first and the third sensor; and d) determining a second ratio (e.g. R2) based on the third and the fourth difference;

e) and for optionally determining a second angle (e.g. θaux12; θaux3) based on the second ratio (e.g. R2), optionally comparing the first angle (e.g. θmain) and the second angle (e.g. θaux12; θaux3) yielding a first outcome; optionally comparing the first ratio (e.g. R1) and the second ratio (e.g. R2) yielding a second outcome;

and outputting at least one of: the second angle (e.g. θaux12; θaux3), the first and the second ratio (e.g. R1, R2), a diagnostic signal based on the first outcome and/or the second outcome.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

BRIEF DESCRIPTION OF THE DRAWINGS

FIG. 5(a) and FIG. 5(b) show an angular sensor system comprising a cylindrical magnet and a magnetic sensor device comprising a substrate and oriented such that the substrate is perpendicular to the rotation axis of the magnet and is mounted in an "off-axis" position.

FIG. 5(c) to FIG. 5(h) illustrate sensor structures and formulas that may be used by the sensor device of FIG. 5(a) to measure an angular position, and to detect an error.

FIG. 6(a) and FIG. 6(b) show an angular sensor system comprising a cylindrical magnet and a magnetic sensor device comprising a substrate and oriented such that the substrate is parallel to the rotation axis of the magnet and is mounted in an "off-axis" position.

FIG. 6(c) to FIG. 6(g) illustrate sensor structures and formulas that may be used by the sensor device of FIG. 6(a) to measure an angular position, and to detect an error.

FIG. 8(a) to FIG. 8(c) show an angular sensor system comprising a cylindrical magnet and a magnetic sensor device comprising a substrate. The sensor device is mounted "near the equator" and is oriented such that the substrate is parallel to the rotation axis of the magnet.

FIG. 8(d) to FIG. 8(f) illustrate sensor structures that may be used by the sensor device of FIG. 8(a) to measure an angular position, and to detect an error.

FIG. 10A to FIG. 10C illustrate variants of the linear position sensor system of FIGS. 9(a) to 9(d), wherein the magnet is a two-pole magnet instead of a magnetic structure comprising a plurality of alternating poles.

Figure 1:
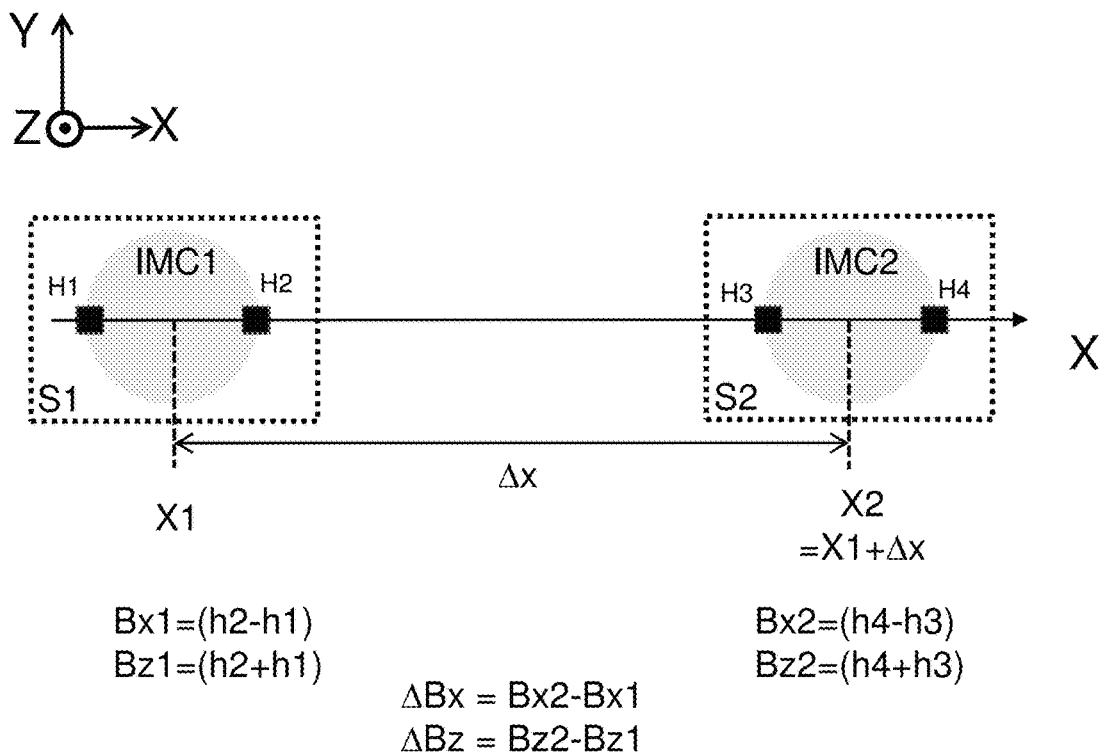
FIG. 1 is a schematic block-diagram of a sensor structure similar to sensor structures as may be used in embodiments of the present invention. The sensor structure comprises a first sensor at a first sensor location X1, and a second sensor at a second location X2, spaced apart along an X-axis. Each sensor comprises an integrated magnetic concentrator (IMC) and a pair of two horizontal Hall elements arranged on opposite sides of the IMC. Each sensor is a 2D magnetic pixel, capable of measuring a first magnetic field component Bx oriented in the X-direction, and a second magnetic field component Bz perpendicular to the X-axis.

The drawings are only schematic and are non-limiting. In the drawings, the size of some of the elements may be exaggerated and not drawn on scale for illustrative purposes. Any reference signs in the claims shall not be construed as limiting the scope. In the different drawings, the same reference signs refer to the same or analogous elements.

DETAILED DESCRIPTION OF ILLUSTRATIVE EMBODIMENTS

The present invention will be described with respect to particular embodiments and with reference to certain drawings, but the invention is not limited thereto but only by the claims.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

The terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment.

Thus, the claims following the detailed description are hereby expressly incorporated into this detailed description, with each claim standing on its own as a separate embodiment of this invention.

Furthermore, while some embodiments described herein include some, but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In this document, unless explicitly mentioned otherwise, the term "magnetic sensor device" or "sensor device" refers to a device comprising at least one "magnetic sensor" or at least one magnetic "sensor element", preferably integrated in a semiconductor substrate. The sensor device may be comprised in a package, also called "chip", although that is not absolutely required. The sensor device preferably contains a semiconductor substrate.

In this document, the term "sensor element" or "magnetic sensor element" or "magnetic sensor" can refer to a component or a group of components or a sub-circuit or a structure capable of measuring a magnetic quantity, such as for example a magneto-resistive element, a GMR element, an XMR element, a horizontal Hall plate, a vertical Hall plate, a Wheatstone-bridge containing at least one (but preferably four) magneto-resistive elements, etc. or combinations hereof.

Figure 3:
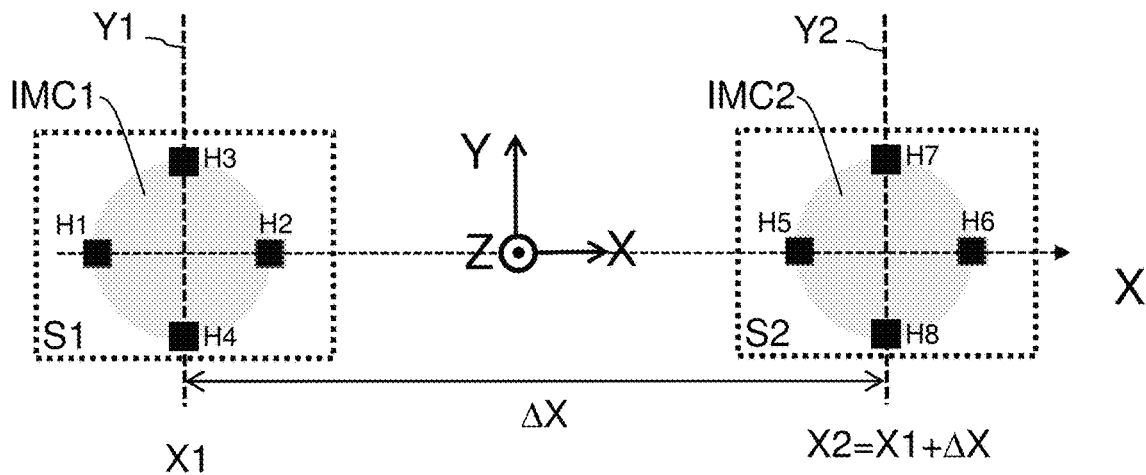
FIG. 3 is a schematic block-diagram of a sensor structure similar to sensor structures as may be used in embodiments of the present invention.

In certain embodiments of the present invention, the term "magnetic sensor" or "magnetic sensor structure" may refer to an arrangement comprising one or more integrated magnetic concentrators (IMC), also known as integrated flux concentrators, and one or more horizontal Hall elements arranged near the periphery of the IMC, for example a disk shaped IMC with two horizontal Hall elements 180° spaced from each other (e.g. as illustrated in FIG. 1), or an IMC with four horizontal Hall elements 90° spaced from each other (e.g. as illustrated in FIG. 3).

In this document, the expression "in-plane component of a magnetic field vector" and "projection of the magnetic field vector in the sensor plane" mean the same. If the sensor device is or comprises a semiconductor substrate, this also means "magnetic field components parallel to the semiconductor plane".

In this document, the expression "out-of-plane component of a vector" and "Z component of the vector" and "projection of the vector on an axis perpendicular to the sensor plane" mean the same.

Embodiments of the present invention are typically described using an orthogonal coordinate system which is fixed to the sensor device, and having three axes X, Y, Z, where the X and Y axis are parallel to the substrate, and the Z-axis is perpendicular to the substrate. Furthermore, the X-axis is preferably oriented "parallel to the direction of relative movement" in case of a linear position sensor", or "tangential to the movement trajectory" in case of a curved movement trajectory, or in a "circumferential direction", i.e. tangential to an imaginary circle having a centre located on the rotation axis in case of an angular position sensor system comprising a rotatable magnet. In case of an angular position sensor system, one of the other axes (Y or Z) is preferably oriented parallel to the rotation axis of the magnet.

In this document, the expression "spatial derivative" or "derivative" or "spatial gradient" or "gradient" are used as synonyms. In the context of the present invention, the gradient is typically determined as a difference between two values measured at two locations spaced apart in the X-direction. In theory the gradient is calculated as the difference between two values divided by the distance "dx" between the sensor locations, but in practice the division by "dx" is often omitted, because the measured signals need to be scaled anyway. Hence, in the context of the present invention, the magnetic field difference (ΔBx) and magnetic field gradient dBx/dx are used interchangeably.

In this document, the term "magnitude of a magnetic field component By" means "the maximum of the absolute value of the By-signal over a full 360° (electrical) rotation", and likewise for Bx and Bz.

In this application, horizontal Hall plates are typically referred to by H1, H2, etc., signals from these horizontal Hall plates are typically referred to by h1 h2, etc.; vertical Hall plates are typically referred to by V1, V2, etc.; and signals from these vertical Hall plates are typically referred to by v1, v2, etc.

In the context of the present invention, the formulas arctan(x/y), atan2(x,y), arccot(y/x) are considered to be equivalent.

In this application, when reference is made to "the sensor device is located at an axial position z, and a radial position Rs", what is actually meant is that a central position of the sensors of that device are located at said axial and radial position.

The present invention is related in general to linear or angular magnetic position sensor systems, comprising a sensor device and a magnetic source, e.g. a permanent magnet, e.g. an axially or diametrically or radially magnetized ring or disk magnet, e.g. an axially or diametrically magnetized two-pole ring or disk magnet, or an axially or radially magnetized ring or disk magnet having more than two poles, e.g. at least four poles or at least six poles or at least eight poles. The present invention is also related to linear position sensor systems comprising a sensor device and a magnetic source in the form of a two-pole magnet or an elongated magnetic structure comprising a plurality of alternating poles.

More specifically, the present invention is related to magnetic sensor devices and methods and systems which are robust against an external disturbance field, and which have error detection capabilities.

Referring to the Figures.

FIG. 1 shows a sensor structure comprising a first sensor S1 located at a first location X1 on an X-axis, and a second sensor S2 located at a second location X2 on said X-axis, spaced from X1.

Each of the first and second sensor S1, S2 comprises a disk shaped integrated magnetic concentrator (IMC) and two horizontal Hall elements arranged on the X-axis, on opposite sides of the IMC. The first sensor S1 comprises a first horizontal Hall element H1 configured for providing a first signal h1, and a second horizontal Hall element H2 configured for providing a second signal h2. The second sensor S2 comprises a third horizontal Hall element H3 configured for providing a third signal h3, and a fourth horizontal Hall element H4 configured for providing a fourth signal h4.

In order to understand the present invention, it suffices to know that the signals h1 and h2 of the first sensor S1 can be combined to determine both an in-plane magnetic field component Bx1 (parallel to the sensor substrate) and an out-of-plane magnetic field component Bz1 (perpendicular to the sensor substrate). More in particular, the in-plane magnetic field component Bx1 can be calculated by a subtraction of the signals, and the out-of-plane magnetic field component Bz1 can be calculated by a summation of the signals. This can be expressed mathematically as follows:

$$Bx1=(h2-h1) \qquad [1]$$

$$Bz1=(h2+h1) \qquad [2]$$

Likewise, the in-plane magnetic field component Bx2, and the out-of-plane magnetic field component Bz2 at the second sensor location X2 can be determined, e.g. in accordance with the following formulas:

$$Bx2=(h4-h3) \qquad [3]$$

$$Bz2=(h4+h3) \qquad [4]$$

And from these values an in-plane magnetic field gradient ΔBx and an out-of-plane magnetic field gradient ΔBz can be determined, e.g. in accordance with the following formulas:

$$\Delta Bx=Bx2-Bx1 \qquad [5]$$

$$\Delta Bz=Bz2-Bz1 \qquad [6]$$

The value ΔBx can also be referred to as dBx/dx, and the value ΔBz can also be referred to as dBz/dx. As mentioned above, the scaling factor "dx" is typically omitted, because it is constant, and the values obtained from the sensor elements need to be scaled anyway. For this reason, in this application the terms "magnetic field gradient" and "magnetic field difference" mean the same.

It is known that the gradient signals ΔBx, ΔBz are highly insensitive to an external disturbance field.

Figure 2A:
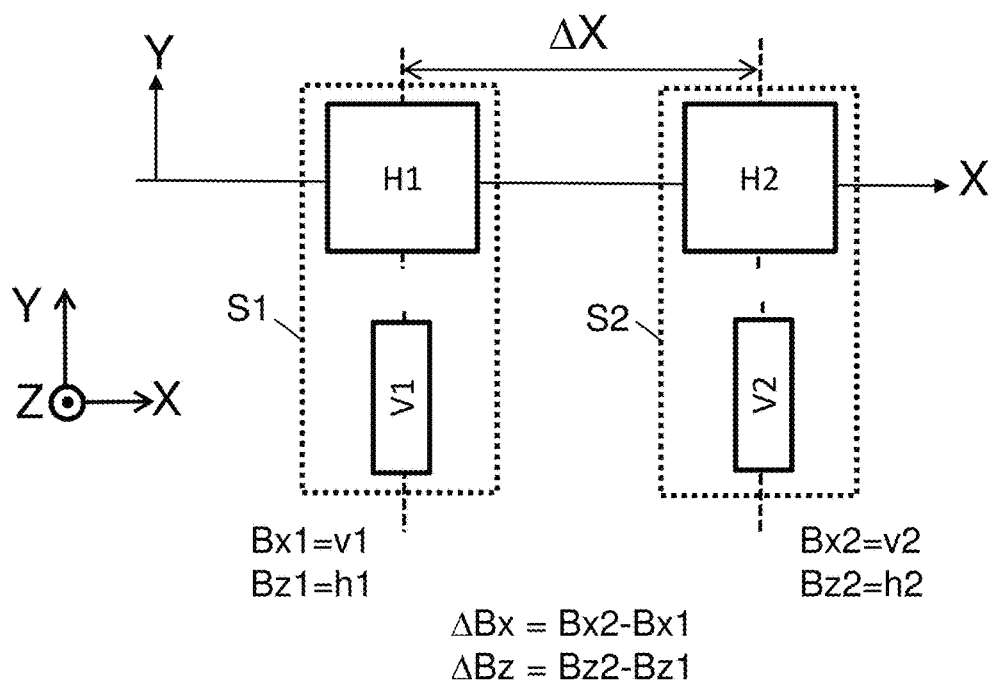
FIG. 2A is a schematic block-diagram of another sensor structure similar to sensor structures as may be used in embodiments of the present invention.

FIG. 2A is a schematic block-diagram of another sensor structure similar to sensor structures as may be used in embodiments of the present invention. The sensor structure comprises a first sensor at a first sensor location X1, and a second sensor at a second sensor location X2, spaced apart along an X-axis, e.g. by a distance Δx in the range from 1.0 to 3.0 mm, preferably in the range from 1.5 to 2.5 mm. The first sensor S1 comprises a horizontal Hall element H1 and a vertical Hall element V1 and is capable of measuring two orthogonal magnetic field components Bx1 and Bz1. The second sensor S2 comprises a horizontal Hall element H2 and a vertical Hall element V2 and is capable of measuring two orthogonal magnetic field components Bx2 and Bz2. The vertical Hall elements V1, V2 have an axis of maximum sensitivity oriented in the X-direction. The horizontal Hall elements H1, H2 have a direction of maximum sensitivity oriented in the Z-direction. If the sensor elements are integrated in a semiconductor substrate, the magnetic field components Bx1 and Bx2 are parallel to the substrate, whereas the magnetic field components Bz1, Bz2 are perpendicular to the substrate. Two differences or gradients can be derived from these signals, namely ΔBx=Bx2−Bx1 and ΔBz=Bz2−Bz1.

Figure 2B:
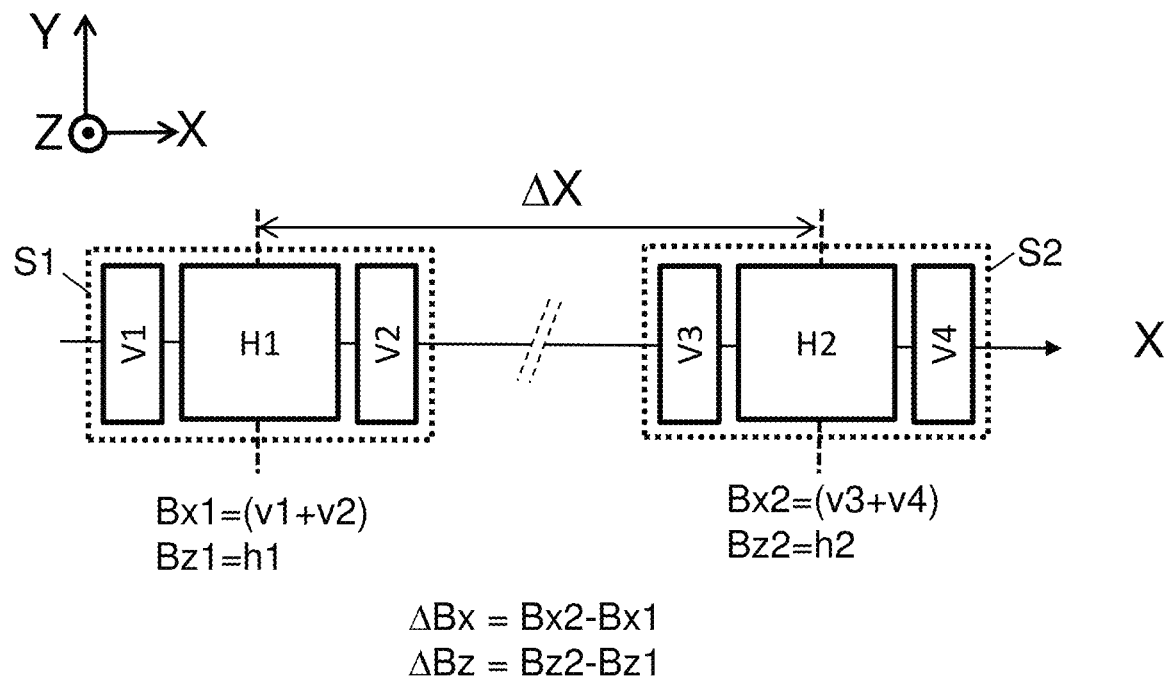
FIG. 2B is a schematic block-diagram of another sensor structure similar to sensor structures as may be used in embodiments of the present invention.

FIG. 2B is a schematic block-diagram of another sensor structure similar to sensor structures as may be used in embodiments of the present invention. The sensor structure comprises a first sensor S1 at a first sensor location X1, and a second sensor S2 at a second sensor location X2, spaced apart along an X-axis, e.g. by a distance Δx in the range from 1.0 to 3.0 mm, preferably in the range from 1.5 to 2.5 mm. The first sensor S1 comprises a horizontal Hall element H1 and two vertical Hall elements V1, V2, located on opposite sides of the horizontal Hall element H1, and having an axis of maximum sensitivity oriented in the X-direction. Likewise, the second sensor S2 comprises a horizontal Hall element H2 and two vertical Hall elements V3, V4, located on opposite sides of the horizontal Hall element H2, and having an axis of maximum sensitivity oriented in the X-direction. The sum or average of the signals v1 and v2 obtained from the vertical Hall elements V1 and V2 is proportional to the magnetic field component Bx1 at the first sensor location X1. The signal h1 obtained from the horizontal Hall element H1 is proportional to the magnetic field component Bz1 at the first sensor location. Likewise, Bx2=(v3+v4) and Bz2=h2. Two differences or gradients can be derived from these signals, namely ΔBx=Bx2−Bx1 and ΔBz=Bz2−Bz1.

Figure 2C:
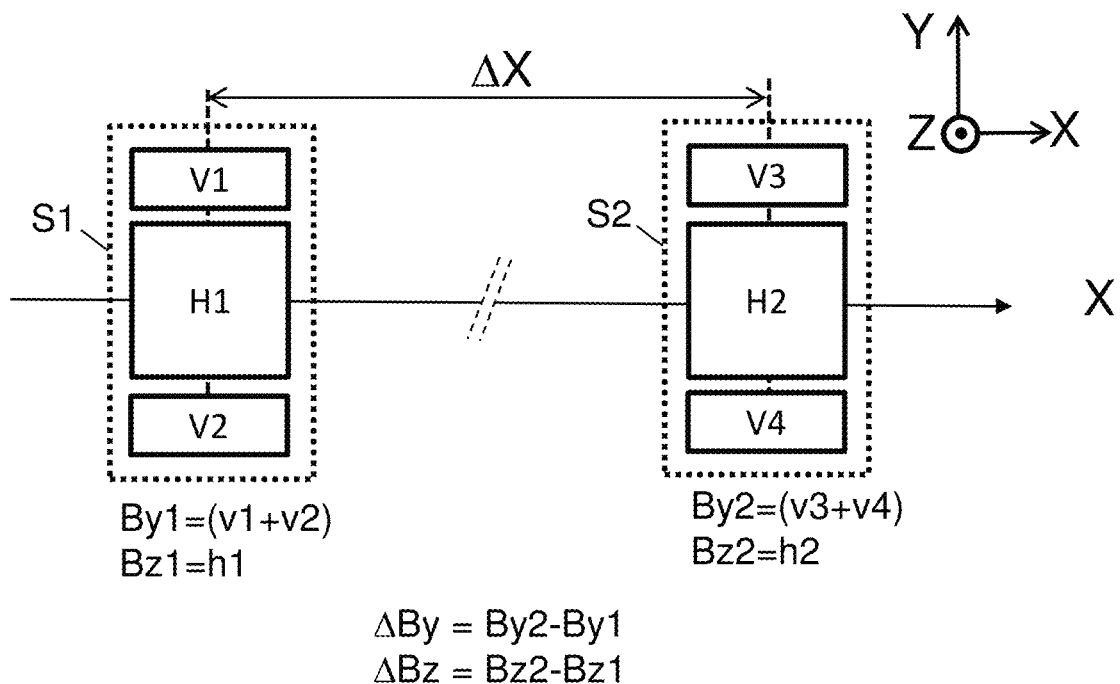
FIG. 2C is a schematic block-diagram of another sensor structure similar to sensor structures as may be used in embodiments of the present invention.

FIG. 2C is a schematic block-diagram of another sensor structure similar to sensor structures as may be used in embodiments of the present invention. The sensor structure comprises a first sensor S1 at a first sensor location X1, and a second sensor S2 at a second sensor location X2, spaced apart along an X-axis, e.g. by a distance Δx in the range from 1.0 to 3.0 mm, preferably in the range from 1.5 to 2.5 mm. The first sensor S1 comprises a horizontal Hall element H1 and two vertical Hall elements V1, V2, located on opposite sides of the horizontal Hall element H1, and having an axis of maximum sensitivity oriented in the Y-direction, perpendicular to the X-axis but parallel to the substrate in which the sensor elements are implemented. Likewise, the second sensor S2 comprises a horizontal Hall element H2 and two vertical Hall elements V3, V4, located on opposite sides of the horizontal Hall element H2, and having an axis of maximum sensitivity oriented in the Y-direction. Two magnetic field components By1, Bz1 can be measured by the first sensor S1, namely as By1=(v1+v2) and Bz1=h1. Likewise, By2=(v3+v4) and Bz2=h2. Two differences or gradients can be derived from these signals, namely ΔBy=By2−By1 and ΔBz=Bz2−Bz1.

Each of the sensors S1 and S2 of FIG. 1 to FIG. 2C are called a "2D magnetic pixel", because they are capable of measuring two orthogonal magnetic field component values.

FIG. 3 is a schematic block-diagram of a sensor structure similar to sensor structures as may be used in embodiments of the present invention. The sensor structure comprises a first sensor S1 at a first sensor location X1, and a second sensor S2 at a second sensor location X2, spaced apart along an X-axis, e.g. by a distance Δx in the range from 1.0 to 3.0 mm, preferably in the range from 1.5 to 2.5 mm. Each sensor comprises an integrated magnetic concentrator (IMC) and four horizontal Hall elements situated near a periphery of the IMC and spaced apart by multiples of 90°. Two of these horizontal Hall elements are located on the X-axis. Each sensor is a 3D magnetic pixel, capable of measuring three orthogonal magnetic field components, Bx, By, Bz at the respective sensor location. Three differences or gradients can be derived from these signals, namely ΔBx=Bx2−Bx1, ΔBy=By2−By1 and ΔBz=Bz2−Bz1.

Figure 4:
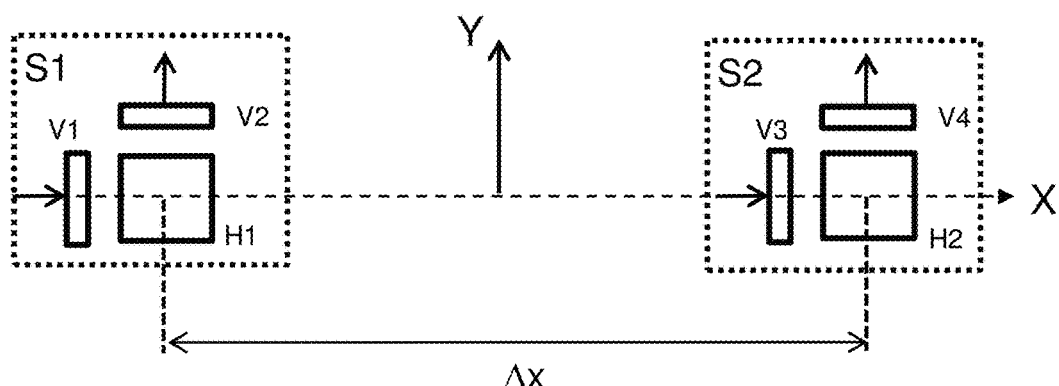
FIG. 4 is a schematic block-diagram of another sensor structure similar to sensor structures as may be used in embodiments of the present invention.

FIG. 4 is a schematic block-diagram of another sensor structure similar to sensor structures as may be used in embodiments of the present invention. The sensor structure comprises a first sensor at a first sensor location X1, and a second sensor at a second sensor location X2, spaced apart along an X-axis, e.g. by a distance Δx in the range from 1.0 to 3.0 mm, preferably in the range from 1.5 to 2.5 mm. Each sensor comprises a horizontal Hall element H1, H2 and two vertical Hall elements having axes of maximum sensitivity oriented in perpendicular directions, namely one in the X-direction and one in the Y-direction. Each sensor is a 3D magnetic pixel, capable of measuring three orthogonal magnetic field components, Bx, By, Bz. Three differences or gradients can be derived from these signals, namely ΔBx=Bx2−Bx1, ΔBy=By2−By1 and ΔBz=Bz2−Bz1.

In a variant of FIG. 4, each sensor has one horizontal Hall element and two pairs of vertical Hall elements, one pair having an axis of maximum sensitivity oriented in the X-direction as in FIG. 2B, and one pair having an axis of maximum sensitivity oriented in the Y-direction as in FIG. 2C. Functionally, this variant also has two 3D magnetic pixels, and is capable of measuring the same signals, but the signal-to-noise ratio (SNR) of the Bx and By signal is better than that of FIG. 4.

FIG. 5(a) and FIG. 5(b) show an angular position sensor system 500 comprising a magnet 501 and a sensor device 502.

The magnet is a permanent magnet. The magnet has a cylindrical shape with a bottom surface 512 and a top surface 511. The magnet is rotatable about a rotation axis A. The magnet may be an axially magnetized ring or disk magnet having at least four pole pairs (also referred to as quadrupole) or having at least six pole pairs or having at least eight pole pairs. The magnet has an outer diameter Do, an outer radius Ro, and a height H. If the magnet is a ring magnet, the magnet also has an inner radius Ri.

The sensor device 502 has a substrate, e.g. a semiconductor substrate. An orthogonal coordinate system with three axes X, Y, Z is fixed to the sensor device. The axes X and Y are parallel to the substrate. The axis Z is perpendicular to the substrate. The direction X is tangential to an imaginary circle having a centre located on the rotation axis A.

The magnet may have an outer diameter of 4.0 to 20 mm, e.g. about 10 or about 12 mm.

The sensor device 502 is mounted in an "off-axis" position relative to the magnet and is oriented such that the substrate is oriented perpendicular to the rotation axis A of the magnet.

According to principles of the present invention, the sensor device comprises three magnetic sensors, a first sensor S1, a second sensor S2, and a third sensor S3. The three sensors S1, S2, S3 may be located on a straight line, but that is not absolutely required, and alternatively (not shown) the sensors may be located on a triangle. The sensors may be equidistantly spaced from each other, but that is not absolutely required.

The sensor device 502 is located relative to the magnet 501 such that the second sensor S2 is located at a radial distance Rs from the rotation axis A, and at an axial distance "g" from the magnet, (in the example: above the top surface 511). The radial distance Rs may be 20% to 80% of an outer radius Ro of the magnet, or 30% to 70%, or 40% to 60%. The axial distance "g" may be 0.5 to 5.0 mm, e.g. about 2.0 mm, but the present invention is not limited thereto and other values may also be used.

FIG. 5(c), FIG. 5(d) and FIG. 5(g) show three illustrative sensor structures, which can be implemented in the sensor device 502, but the present invention is not limited thereto, and other sensor elements may also be used, for example MR (magneto-resistive) elements.

Importantly, each magnetic sensor S1, S2, S3 is capable of measuring at least a first magnetic field component Bx oriented in the first direction X, and a second magnetic field component Bz oriented in a second direction Z, perpendicular to the first direction X.

In FIG. 5(c), six magnetic field components can be determined, as follows:

| | | |
|---|---|---|
| using signals from S1: | Bx1 = (h2 − h1); | Bz1 = (h2 + h1); |
| using signals from S2: | Bx2 = (h4 − h2); | Bz2 = (h4 + h2); |
| using signals from S3: | Bx3 = (h6 − h5); | Bz3 = (h6 + h5); |

In an embodiment of the present invention, the sensor device further comprises a processing circuit configured for:
a) determining a first difference $\Delta Bx13$ between the first magnetic field components Bx1, Bx3 provided by the first and the third sensor S1, S3; and for determining a second difference $\Delta Bz13$ between the second magnetic field components Bz1, Bz3 provided by the first and the third sensor S1, S3; and for calculating a first angle $\theta main$ based on a ratio of the first difference $\Delta Bx13$ and the second difference $\Delta Bz13$, and for outputting the first angle $\theta main$; and for
b) determining a third difference $\Delta Bx12$ between the first magnetic field component Bx2 provided by the second sensor S2 and the first magnetic field component Bx1 provided by the first sensor S1; and for
c) determining a fourth difference $\Delta Bz12$ between the second magnetic field component Bz2 provided by the second sensor S2 and the second magnetic field component Bz1 provided by the first sensor S1; and for
d) determining a second angle $\theta aux12$ based on the third and the fourth difference $\Delta Bx12$, $\Delta Bz12$; and for
e) outputting said second angle $\theta aux12$ and/or outputting a diagnostic signal derived from a comparison of the first angle $\theta main$ and the second angle $\theta aux12$.

The angle may be calculated based on a ratio of the first and the second difference, e.g. using an arctangent function of that ratio. The angle can also be determined using a look-up table with interpolation, for example, or in any other suitable way.

The steps (a) to (d) can be summarized as: "calculating a first angle $\theta main$ based on $\Delta Bx13$ and $\Delta Bz13$ and calculating a second angle $\theta aux12$ based on $\Delta Bx12$ and $\Delta Bz12$". The first angle (also referred to as "main angle") is the angle to be measured; the second angle (also referred to as "auxiliary angle") can be used to detect an error. The error detection may be performed by the sensor device itself, or may be performed outside of the sensor device, e.g. in an ECU.

The angle $\theta main$ and $\theta aux12$ are, in fact, slightly offset by a constant angle $\epsilon 12$, which depends on the dimensions of the sensor device and the dimensions of the magnet, and the relative position of the sensor device and the magnet. This value may be determined by simulation, or by calibration, and stored in a non-volatile memory of the sensor device. The test whether an error has occurred may comprise testing whether the angle $\theta main$ matches the angle ($\theta aux12 + \epsilon 12$) within some tolerance range. It is also possible to simply ignore the offset and compare $\theta main$ and $\theta aux12$ with a somewhat larger tolerance margin.

In an embodiment, the sensor device may determine and output the diagnostic signal, and optionally also the second angle. In another embodiment, the sensor device does not perform the error detection itself, and only outputs the first angle and the second angle.

It is important to note that both angles are calculated based on magnetic field differences (or gradients) and are thus highly insensitive to an external disturbance field.

The first angle is typically more accurate (in terms of SNR), because the distance d13 between the sensors S1 and S3 is larger than the distance d12 between the sensors S1 and S2, but it was found that the second angle $\theta aux12$ is still sufficiently accurate to detect an error.

In preferred embodiments, the distance d13 between the outer sensors S1 and S3 is a value in the range from 1.0 to 3.0 mm, or from 1.5 to 2.5 mm, e.g. equal to about 2.2 mm. This means that preferably, the size of the substrate with three sensors (e.g. illustrated in FIG. 5(e)) does not need to be larger than the size of the substrate with only two sensors (e.g. illustrated in FIG. 1).

The second sensor S2 may be located in the middle between S1 and S3, but that is not absolutely required, and S2 may be located closer to S3, for example at a distance d23 of about 0.4 mm from S3. The closer S2 to S3, and thus the further S1 and S2, the larger the amplitude of the signals $\Delta Bx12$ and $\Delta Bz12$, and thus, the better the accuracy of the second angle. It is not trivial to locate the second sensor S2 at a distance d23 of only 0.4 mm from S3, because it is known that IMC bends the magnetic field lines, and that a typical diameter of the IMC is about 150 to 250 μm. A skilled person cannot predict that two IMC disks which are so close to each other, will not interfere.

In the example described above, a first angle $\theta main$ is calculated based on $\Delta Bx13$ and $\Delta Bz13$ (obtained from S1 and S3), and a second angle $\theta aux12$ is calculated based on $\Delta Bx12$ and $\Delta Bz12$ (obtained from S1 and S2).

In a variant, a first angle θmain is calculated based on ΔBx13 and ΔBz13 (obtained from S1 and S3), and a second angle θaux23 is calculated based on ΔBx23 and ΔBz23 (obtained from S2 and S3). This is possible, and this second angle will also have a slight (fixed) offset from the main angle. The diagnostic test may include testing whether θmain and (θaux23+ε23) sufficiently match (using a predefined criterium).

In a variant, a first angle θmain is calculated based on ΔBx13 and ΔBz13 (obtained from S1 and S3), and an angle θaux12 is calculated based on ΔBx12 and ΔBz12 (obtained from S1 and S2), and an angle θaux23 is calculated based on ΔBx23 and ΔBz23 (obtained from S2 and S3), and the latter two angles are averaged, and the average of (θaux12+θaux23)/2 is considered the second angle. If the second sensor S2 is located in the middle between S1 and S3, this second angle does not have an offset with respect to the main angle, hence, the diagnostic test may include testing whether θmain and (θaux12+θaux23)/2 sufficiently match (using a predefined criterium).

In another or further variant, the second sensor S2 is located in the middle between S1 and S3, and besides the main angle, four differences are calculated: ΔBx12, ΔBz12, ΔBx23, ΔBz23, and an angle θaux3 is calculated using the following formula: θaux3=atan2[(ΔBx23−ΔBx12),(ΔBz23−ΔBz12)]. This angle θaux3 should be 900 phase shifted relative to the main angle θmain.

These variants are referred to by the formulas in FIG. 5(e) and FIG. 5(f).

So far, mainly the embodiment of a sensor device having a sensor structure as depicted in FIG. 5(c) has been described, but the invention is not limited thereto, and a sensor device with a sensor structure as illustrated in FIG. 5(d) can also be used. Everything mentioned above for the embodiment with a sensor structure as in FIG. 5(c) is also applicable here, the only difference being that the magnetic field components are measured differently. In FIG. 5(d), six magnetic field components can be determined, as follows:

| using signals from S1: | Bx1 = v1; | Bz1 = h1; |
| using signals from S2: | Bx2 = v2; | Bz2 = h2; |
| using signals from S3: | Bx3 = v3; | Bz3 = h3; |

But the same formulas for the differences, as mentioned above, can be used here. For example:

| ΔBx12 = Bx2 − Bx1; | ΔBz12 = Bz2 − Bz1; |
| ΔBx13 = Bx3 − Bx1; | ΔBz13 = Bz3 − Bz1; |
| ΔBx23 = Bx3 − Bx2; | ΔBz23 = Bz3 − Bz2; |

And the same formula for the main angle and for the auxiliary angles, as described above, are also applicable for the sensor structure of FIG. 5(d).

It will be appreciated that the sensor structure of FIG. 5(c) and of FIG. 5(d) contains three "2D-magnetic pixels", each capable of measuring one magnetic field component Bx parallel to the substrate, and one magnetic field component Bz perpendicular to the substrate. But the present invention is not limited thereto, and other sensor structures, for example the sensor structure shown in FIG. 5(g) containing three sensors S1, S2, S3, spaced apart along the X-direction, and each capable of measuring three magnetic field components can also be used. The same formulas as described for FIG. 5(c) are also applicable, in which only the Bx and Bz components would be used, and By component would be ignored. The sensor structure of FIG. 5(g) containing three IMC disks, each with four horizontal Hall plates, provides an additional advantage, however. Despite the fact that the By-component is not used in the arrangement of FIG. 5(a), an additional test can be performed, thus increasing the probability that an error could be found. Indeed, the component Bz1 can be calculated as (h1+h2), or as (h3+h4) which should (normally) provide approximately the same result. This test is referred to herein as "the Bz-test" Thus, when it is detected that (h1+h2) does not match (h3+h4), an error is detected, which could be an error related to the Hall elements H1 or H2. A similar test can be performed by sensor S2 and by sensor S3. Thus, the structure of FIG. 5(g), when used in the sensor device 502 of FIG. 5(a), offers the same functionality as the sensor structure of FIG. 5(c), plus three additional tests indicative of a potential error.

Moreover, the structure of FIG. 5(g) not only allows to detect an error, but also to correct certain errors. Indeed, suppose that "the Bz-test" is OK for sensor S1 and for sensor S2, but is not OK for sensor S3, then this could mean that one of the Hall elements H9 to H12 is defective, potentially H9. It may then be better to output the angle θaux12 (based on signals obtained from S1 and S2, but not S3), rather than θmain (based on signals obtained from S1 and S3). In such embodiment, the second sensor is preferably located in the middle between S1 and S3, such that the signal-to-noise ratio of the angle derived from the signals obtained from S1 and S2 is the same as the signal-to-noise ratio of the angle derived from the signals obtained from S2 and S3.

Alternatively, if the Bz-test is not OK for S2, but is OK for S1 and for S3, it could mean that it is likely that one of the sensor elements H5 to H8 is defective, and that the main angle θmain (based on S1 and S3, but not S2) is correct, despite the fact that this angle θmain does not match any of θaux12 (based on signals obtained from S1 and S2) or θaux23 (based on signals obtained from S2 and S3).

FIG. 6(a) and FIG. 6(b) show an angular sensor system 600 comprising a cylindrical magnet 601 and a magnetic sensor device 602 comprising a substrate and oriented such that the substrate is parallel to the rotation axis A of the magnet. This sensor system can be considered a variant of the sensor system 500 of FIG. 5(a) and FIG. 5(b), and many of the same principles are also applicable here, such as e.g. the use of three sensors S1, S2, S3 spaced apart along the X-axis, each capable of measuring two orthogonal magnetic field components, calculating a main angle θmain based on the signals obtained from the first sensor S1 and the third sensor S3, and calculating one or more auxiliary angles, e.g. θaux12 (based on signals obtained from S1 and S2), or θaux23 (based on signals obtained from S2 and S3), or θaux3 (based on signals obtained from S1 and S2 and S3), and testing whether the main angle matches one or more of these auxiliary angles. The sensor elements S1 to S3 of the sensor device 602 must also be able to measure a first magnetic field component Bx in the X-direction, tangential to an imaginary circle having a centre located on the rotation axis A, but they need to be able to measure a second magnetic field component By oriented in the Y-direction, parallel to the rotation axis of the magnet, and parallel to the substrate of the sensor device. That is not possible using the sensor structures shown in FIG. 5(c) or FIG. 5(d) but is possible using a sensor structure shown in FIG. 6(c) or FIG. 6(d). It is noted that this would also be possible using a sensor structure having MR elements, which are also capable of measuring Bx and By parallel to the substrate.

FIG. 6(c) shows how the magnetic field components Bx and By can be derived from the signals provided by the horizontal Hall elements.

FIG. 6(d) shows how the magnetic field components Bx and By can be derived from the signals provided by the vertical Hall elements.

Everything else described above is also applicable here, mutatis mutandis, meaning inter alia: after replacing Bz by By, and ΔBz by ΔBy.

The formulas of FIG. 6(g) are applicable for the sensor structure of FIG. 6(c), and can be used as additional tests, if desired.

Figure 7A:
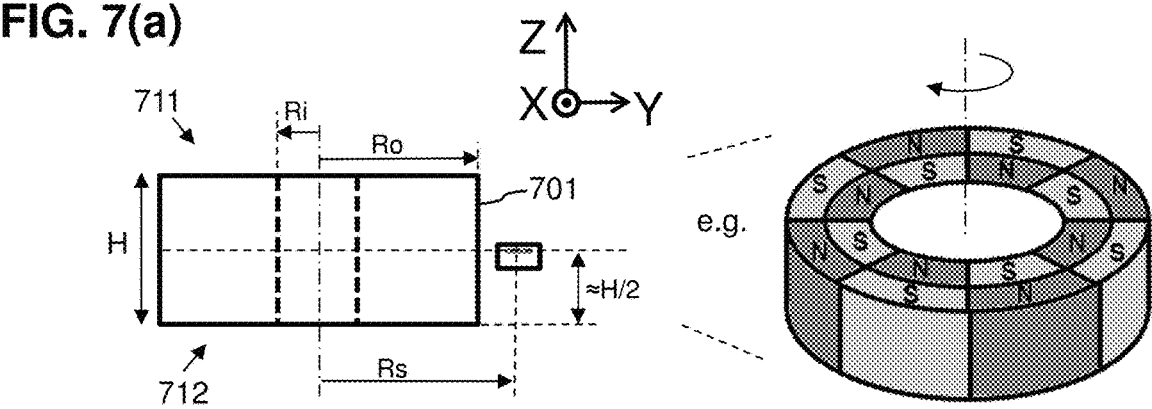
FIG. 7(a) and FIG. 7(b) show an angular sensor system comprising a cylindrical magnet and a magnetic sensor device comprising a substrate. The sensor device is mounted "near the equator" and is oriented such that the substrate is perpendicular to the rotation axis of the magnet.
Figure 7B:
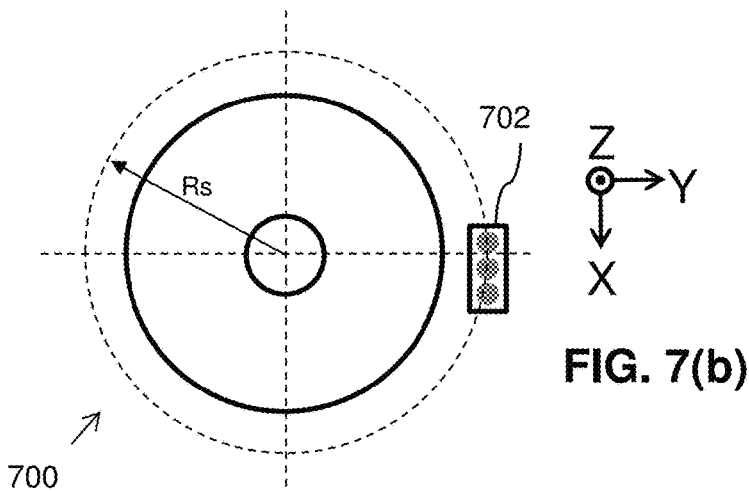

FIG. 7(a) and FIG. 7(b) show an angular sensor system 700 comprising a cylindrical magnet 701 and a magnetic sensor device 702 comprising a substrate. The sensor device 702 is mounted "on or near the equator" and is oriented such that the substrate is perpendicular to the rotation axis of the magnet 701. The radial position Rs of the sensor device may be 105% to 200% of the outer radius Ro of the cylindrical magnet, or 105% to 175%, or 105% to 150%, or 110% to 150%. The magnet is preferably a radially magnetized ring magnet having a plurality of pole pairs, for example having at least four pole pairs, or at least six pole pairs, or at least eight pole pairs.

Figure 7C:
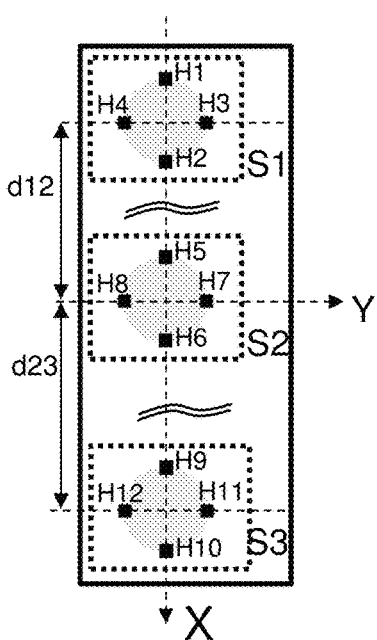
FIG. 7(c) and FIG. 7(d) illustrate sensor structures that may be used by the sensor device of FIG. 7(a) to measure an angular position, and to detect an error.
Figure 7D:
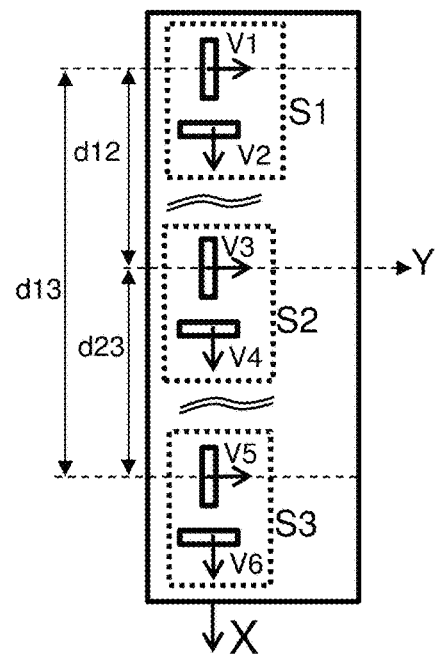

FIG. 7(c) and FIG. 7(d) illustrate sensor structures that can be used by the sensor device 702 of FIG. 7(a) to measure an angular position of the sensor device relative to the magnet, and to detect an error. The exact same formulas as provided in FIG. 6(c) to FIG. 6(g) are also applicable here.

The sensor device 702 is preferably situated at an axial position substantially halfway between the top surface 711 and the bottom surface 712, but this position is not critical.

FIG. 8(a) to FIG. 8(c) show an angular sensor system 800 comprising a cylindrical magnet and a magnetic sensor device 802 comprising a substrate. The sensor device 802 is mounted "on or near the equator" and is oriented such that the substrate is parallel to the rotation axis of the magnet. The radial position Rs of the sensor device may be 105% to 200% of the outer radius Ro of the cylindrical magnet, or 105% to 175%, or 105% to 150%, or 110% to 150%. The magnet is preferably a radially magnetized ring magnet having a plurality of pole pairs, for example having at least four pole pairs, or at least six pole pairs, or at least eight pole pairs.

FIG. 8(d) to FIG. 8(f) illustrate sensor structures that can be used by the sensor device 802 of FIG. 8(a) to measure an angular position of the sensor device relative to the magnet, and to detect an error. The exact same sensor structures and formulas as provided in FIG. 5(c) to FIG. 5(h) are also applicable here.

The sensor device 802 is preferably situated at an axial position substantially halfway between the top surface 811 and the bottom surface 812, but this position is not critical.

Figure 9A:
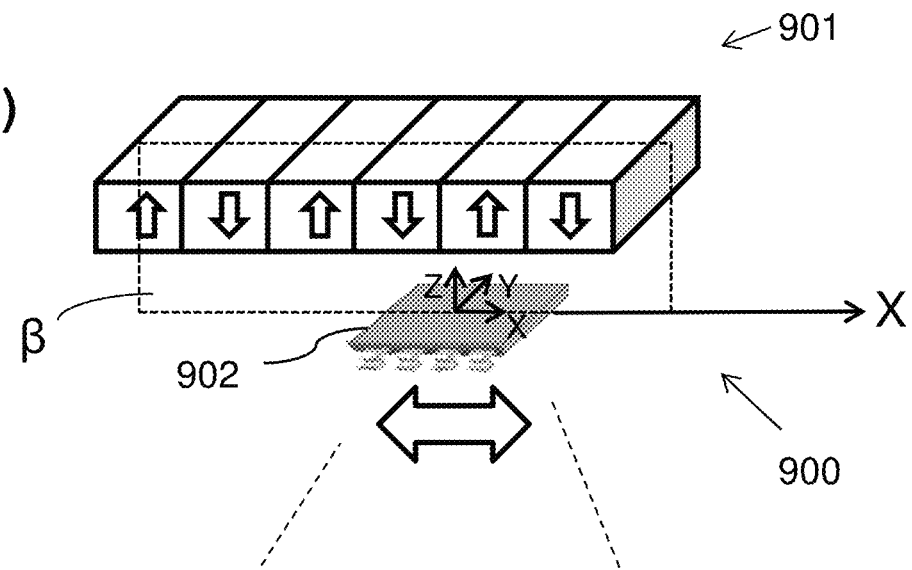
FIG. 9(a) shows a linear sensor system comprising an elongated magnetic structure with a plurality of alternating poles, and a magnetic sensor device comprising a substrate movable relative to the magnetic structure. The sensor device has a substrate which is perpendicular to the remanent magnetic field inside magnetic structure.
Figure 9B:
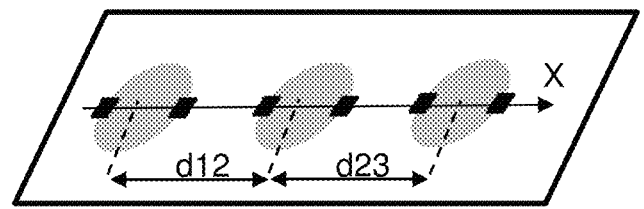
FIG. 9(b) to FIG. 9(d) illustrate sensor structures that may be used by the sensor device of FIG. 9(a) to measure a linear position, and to detect an error.
Figure 9C:
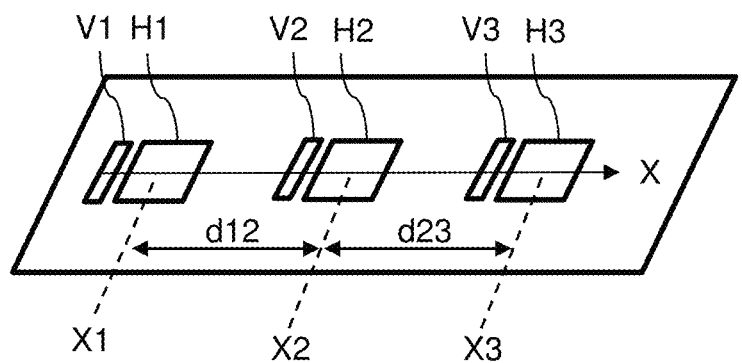
Figure 9D:
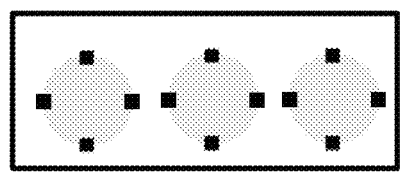

FIG. 9(a) shows a linear sensor system 900 comprising an elongated magnetic structure 901 comprising a plurality of alternating poles, and a magnetic sensor device 902 comprising a substrate movable relative to the magnetic structure. The sensor device 902 has a substrate which is perpendicular to the remanent magnetic field inside the magnetic structure. FIG. 9(b) to FIG. 9(d) illustrate sensor structures that may be used by the sensor device of FIG. 9(a) to measure a linear position, and to detect an error. The exact same sensor structures and formulas as provided in FIG. 5(c) to FIG. 5(h) are also applicable here. In addition to determining an angle, the processing circuit of the sensor device 902 may be further configured to convert the angle value into a linear value, in known manners. The sensor device 902 is preferably situated at a transverse position (Y-direction) substantially in the middle of the magnetic structure, but this position is not critical.

FIG. 10A illustrates a linear position sensor system 1000 which can be regarded as a special case or a variant of the linear position sensor system 900 of FIGS. 9(a) to 9(d), wherein the magnet 1001 is a two-pole magnet instead of a magnetic structure comprising a plurality of alternating poles.

FIG. 10B shows a linear position sensor system 1020 which can be regarded as another variant of the linear position sensor system 900 of FIG. 9(a).

FIG. 10C shows a linear position sensor system 1040 which can be regarded as yet another variant of the linear position sensor system 900 of FIG. 9(a).

In all embodiments of FIG. 10A to FIG. 10C, the sensor device is movable with respect to the magnet in the X-direction, or the magnet is movable relative to the sensor device along the X-direction.

Figure 11:
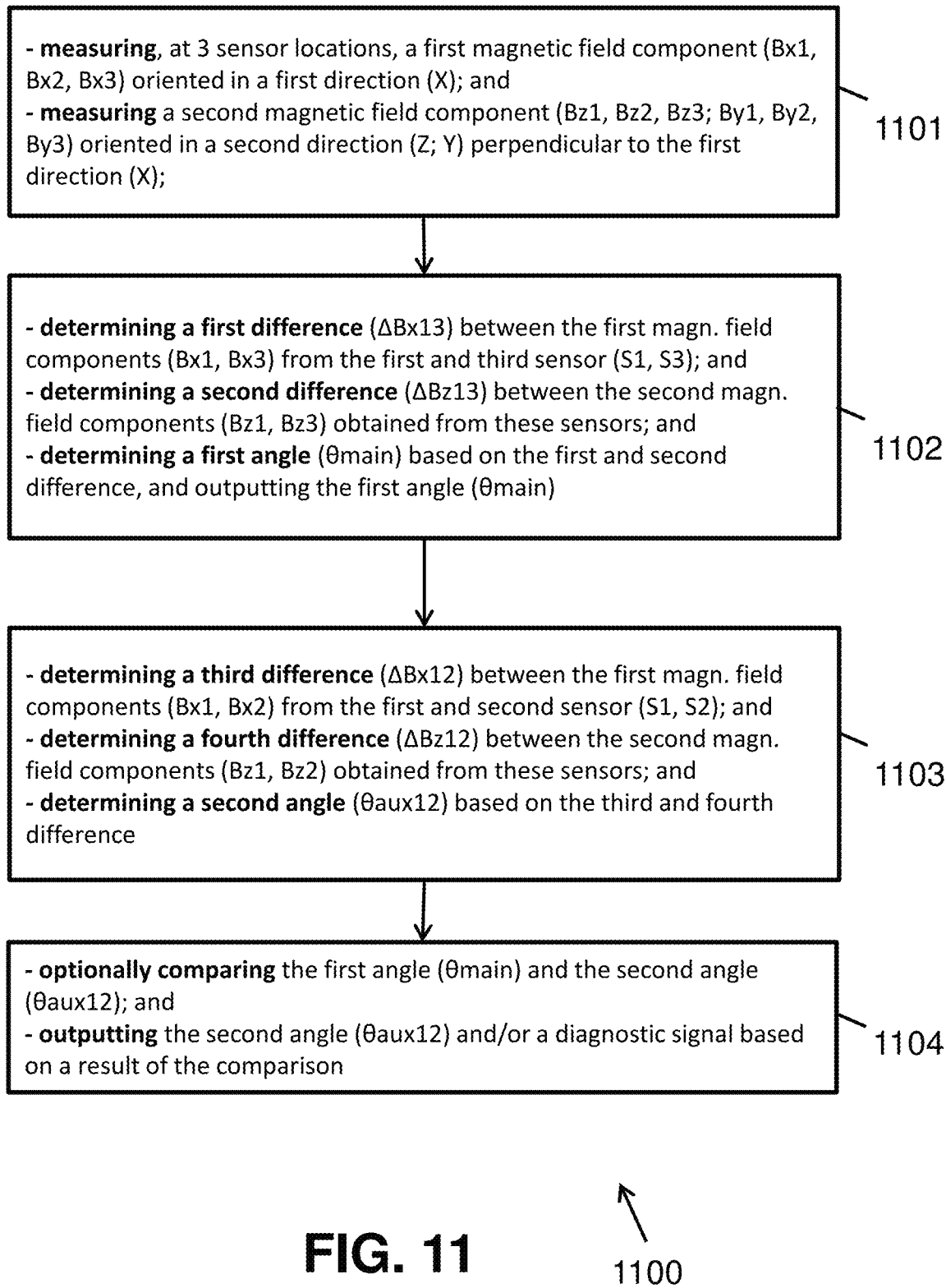
FIG. 11 is a flow-chart of a method proposed by the present invention, which can be performed by a sensor device of FIG. 5(a) or FIG. 6(a) or FIG. 7(a) or FIG. 8(a) or FIG. 9(a) or FIG. 10.

FIG. 11 shows a flow chart of a method which can be performed by a position sensor device of a position sensor system of FIG. 5(a) or FIG. 6(a) or FIG. 7(a) or FIG. 8(a) or FIG. 9(a) or FIG. 10. The method comprises the following steps:

i) measuring (1101), at three sensor locations, a first magnetic field component Bx1, Bx2, Bx3 oriented in a first direction X; and a second magnetic field component (e.g. Bz1, Bz2, Bz3 or By1, By2, By3 or both) oriented in a second direction (Z or Y) perpendicular to the first direction X;

ii) determining (1102) a first difference ΔBx13 between the first magnetic field components Bx1, Bx3 obtained from the first and the third sensor S1, S3; and iii) determining a second difference ΔBz13 between the second magnetic field components Bz1, Bz3 obtained from these sensors; and iv) determining a first angle θmain based on the first and second difference ΔBx13, ΔBz13, (e.g. as an arctangent of a ratio of these differences), and outputting the first angle θmain;

v) determining (1103) a third difference ΔBx12 between the first magnetic field components Bx1, Bx2 obtained from the first and second sensor S1, S2; and vi) determining a fourth difference ΔBz12 between the second magnetic field components Bz1, Bz2 obtained from these sensors; and vii) determining a second angle θaux12 based on the third and fourth difference ΔBx12, ΔBz12, (e.g. as an arctangent of a ratio of these differences);

viii) optionally comparing (1104) the first angle θmain and the second angle θaux12; and ix) outputting the second angle θaux12 and/or a diagnostic signal based on a result of the comparison.

This method is described for only one of the possible second angles, namely θmain=atan2(ΔBx13,ΔBz13), and θaux12=atan2(ΔBx12,ΔBz12), but the present invention is not limited thereto, and many variants are possible.

For example, in a variant, step i) to iv) are also directed to determining a main angle based on the Bx and Bz signals obtained from the first and the third sensor, but step v) to ix) are directed to determining an auxiliary angle θaux23=atan2(ΔBx23,ΔBz23) based on signals obtained from the second and the third sensor; and comparing the main angle and this auxiliary angle θaux23, optionally taking into account a small offset ε12; and outputting this angle or a result of the comparison.

For example, in a variant, both the auxiliary angle θaux12=atan2(ΔBx12,ΔBz12) and the auxiliary angle θaux23=atan2(ΔBx23,ΔBz23) are determined, and an average thereof is calculated, and is compared to the main angle.

In yet another variant, an auxiliary angle is calculated based on the following formula: θaux3=atan2[(ΔBx23−ΔBx12),(ΔBz23−ΔBz12)], and the main angle is compared to this auxiliary angle θaux3 taking into account an offset of about 90°.

Figure 12:
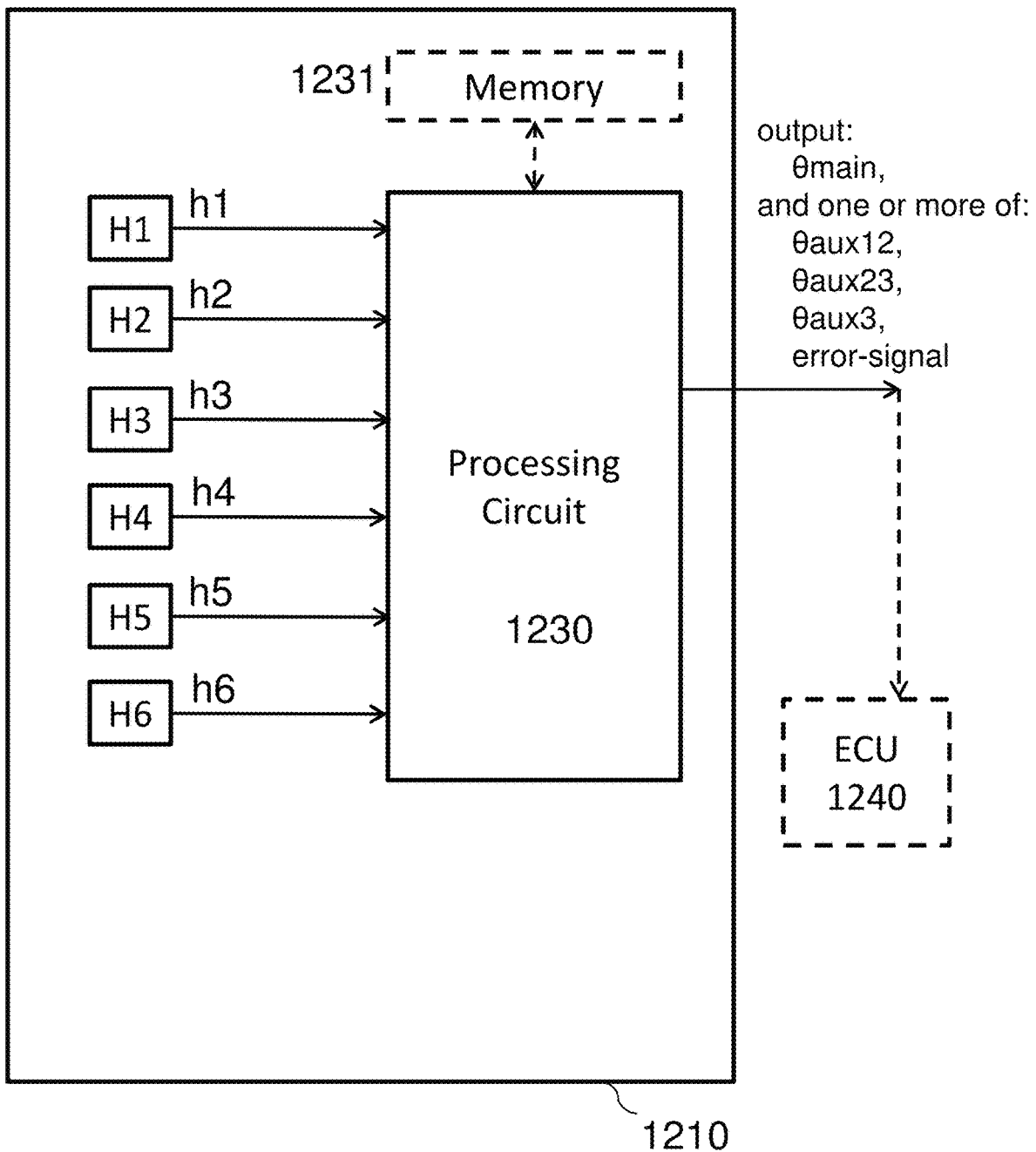
FIG. 12 shows an electrical block-diagrams of circuits that may be used in position sensor devices described above.

FIG. 12 shows an electrical block-diagram of a circuit that may be used in position sensor devices described above, but the present invention is not limited hereto, and other block diagrams may also be used.

The circuit 1210 comprises a plurality of magnetic sensors elements, and a processing unit 1230, and a non-volatile memory 1231. This block-diagram can be used for example in sensor devices having a sensor structure like that of FIG. 5(*c*), comprising six horizontal Hall elements, but the present invention is not limited thereto. For example, in case the sensor device has a sensor structure like that of FIG. 5(*d*), the sensor device would comprise three horizontal Hall elements and three vertical Hall elements. In case the sensor device has a sensor structure like that of FIG. 5(*e*), the sensor device would comprise twelve horizontal Hall elements. In case the sensor device has a sensor structure like that of FIG. 6(*e*), the sensor device would comprise six vertical Hall elements. And as mentioned above, it is also possible to use magneto-resistive (MR) elements instead of vertical Hall elements.

The processing unit 1230 may be configured for performing any of the methods described above, in FIG. 11. The sensor device 1210 may be connected to a second processor 1240, for example to an electronic control unit 1240 (ECU), by means of one or more wires, or wireless (e.g. via a radio frequency link RF, or an infra-red link IR).

The sensor device outputs at least the main angle θmain. Depending on which method is implemented, the sensor device 1210 may also output one or more of the following values: θaux12, θaux23, the average of θaux12, θaux23, θaux3, described above. The sensor device may perform a match or consistency check inside the device and provide a result of the test as a diagnostic signal, but that is not absolutely required, and it is also possible to let the external processor perform the comparison or consistency check.

The processing unit 1230 may comprise a digital processor, which may optionally comprise or be connected to a non-volatile memory 1231. This memory may be configured for storing one or more constants, for example one or more of the offset values ε12, ε23, of threshold values for determining whether the angles match, or deviate too much. The digital processor 1230 may for example be an 8-bit processor, or a 16-bit processor.

While not explicitly shown, the circuit 1210 may further comprise one or more components or sub-circuits selected from the group consisting of: a biasing source (e.g. a current source, a voltage source), an amplifier, a differential amplifier, an analog-to-digital convertor (ΔDC), etc. The ΔDC may have a resolution of at least 8 bits, or at least 10 bits, or at least 12 bits, or at least 14 bits, or at least 16 bits.

The invention claimed is:

1. A position sensor device comprising:
    a substrate comprising a first, a second and a third magnetic sensor spaced apart in a first direction, each magnetic sensor capable of measuring at least a first magnetic field component oriented in the first direction, and a second magnetic field component oriented in a second direction perpendicular to the first direction;
    a processing circuit connected to said magnetic sensors, and configured for:
        a) determining a first difference between the first magnetic field components provided by the first and the third sensor, and configured for determining a second difference between the second magnetic field components provided by the first and the third sensor, and for calculating a first angle based on a ratio of the first difference and the second difference, and for outputting the first angle as a first signal;
        b) and for determining a third difference between the first magnetic field component provided by the second sensor and the first magnetic field component provided by one of the first and the third sensor;
        c) and for determining a fourth difference between the second magnetic field component provided by the second sensor and the second magnetic field component provided by said one of the first and the third sensor;
        d) and for determining a second angle based on the third and the fourth difference, and for outputting a second signal based on said second angle.

2. The position sensor device according to claim 1, wherein the first, second and third sensor are located on a straight line; or
    wherein the first, second and third sensor are located at the corners of a triangle.

3. The position sensor device according to claim 1, wherein the second angle is calculated in accordance with the following formula: θaux12=atan2(ΔBx12, ΔBz12), where θaux12 is the second angle, ΔBx12 is the third difference, and ΔBz12 is the fourth difference.

4. The position sensor device according to claim 1, wherein the processing circuit is further configured for calculating a fifth difference between the first magnetic field component provided by the second sensor and the first magnetic field component provided by the other one of the first and the third sensor; and
    wherein the processing circuit is further configured for calculating a sixth difference between the second magnetic field component provided by the second sensor and the second magnetic field component provided by said other one of the first and the third sensor; and
    wherein the processing circuit is further configured for calculating said second angle as a function of the third and the fourth and the fifth and the sixth difference.

5. The position sensor device according to claim 1, wherein the first, second and third sensor are located on a straight line, and
    wherein the second sensor is situated in the middle between the first and the third sensor.

6. The position sensor device according claim 1, wherein each of the first, second and third sensor comprises an integrated magnetic concentrator and two horizontal Hall element arranged on opposite sides of the integrated magnetic concentrator.

7. The position sensor device according to claim 1, wherein each of the first, second and third sensor comprises a horizontal Hall element and a vertical Hall element; or
    wherein each of the first, second and third sensor comprises a horizontal Hall element and a pair of vertical Hall element located on opposite sides of the horizontal Hall element.

8. The position sensor device according to claim 1, wherein each of the first, second and third sensor comprises two vertical Hall elements, having direction of maximum sensitivity which are perpendicular to each other; or wherein each of the first, second and third sensor comprises two pairs of vertical Hall elements, arranged around a virtual square.

9. The position sensor device according to claim 1, wherein each of the first and the third sensor comprise an integrated magnetic concentrator and four horizontal Hall element angularly spaced by multiples of 90°, consisting of a first and a second Hall element being spaced apart along the first direction, and a third and a fourth Hall element spaced apart in a direction perpendicular to the first direction;
wherein the first angle is calculated based on signals obtained from the first and the second Hall element; and
wherein the sensor device is further configured to determine a first sum as a sum of the signals obtained from the first and the second Hall element, and to calculate a second sum as a sum of the signals obtained from the third and the fourth Hall element, and to take into account a match of the first sum and the second sum when determining the second signal.

10. A magnetic position sensor system comprising:
a magnetic source for generating a magnetic field having at least two poles;
a position sensor device according to claim 1, movable relative to said magnetic source, or vice versa.

11. The magnetic position sensor system according to claim 10, wherein the magnetic source is a permanent magnet, rotatable about a rotation axis; and
wherein the position sensor device is mounted at a nonzero radial distance from the rotation axis, and is oriented such that the first direction is tangential to an imaginary circle having a centre on the rotation axis.

12. An angular position sensor system according to claim 11, wherein the sensor device is arranged in one of the following ways:
i) wherein the substrate of the sensor device is oriented perpendicular to the rotation axis, and the magnet has an outer radius, and a geometric center of the sensors of the sensor device are located at a radial position of 30% to 95% of the outer radius, and at an axial position above a top surface or below a bottom surface of the magnet;
ii) wherein the substrate of the sensor device is oriented parallel to the rotation axis, and the magnet has an outer radius, and a geometric center of the sensors of the sensor device are located at a radial position of 30% to 95% of the outer radius, and at an axial position above a top surface or below a bottom surface of the magnet;
iii) wherein the substrate of the sensor device is oriented perpendicular to the rotation axis, and the magnet has an outer radius, and a geometric center of the sensors of the sensor device are located at a radial position of 105% to 200% of the outer radius, and at an axial position substantially inside the bottom surface or inside the top surface, or at an axial position between the bottom surface and the top surface;
iv) wherein the substrate of the sensor device is oriented parallel to the rotation axis, and the magnet has an outer radius, and a geometric center of the sensors of the sensor device are located at a radial position of 105% to 200% of the outer radius, and at an axial position substantially inside the bottom surface or inside the top surface, or at an axial position between the bottom surface and the top surface;
v) wherein the substrate of the sensor device is oriented perpendicular to the rotation axis, and the magnet has an outer radius, and a geometric center of the sensors of the sensor device are located at a radial position of 105% to 200% of the outer radius, and at an axial position above a top surface or below a bottom surface of the magnet;
vi) wherein the substrate of the sensor device is oriented parallel to the rotation axis, and the magnet has an outer radius, and a geometric center of the sensors of the sensor device are located at a radial position of 105% to 200% of the outer radius, and at an axial position above a top surface or below a bottom surface of the magnet.

13. The magnetic position sensor system according to claim 10, wherein the magnetic source is a two-pole magnet, or an elongated structure extending in a longitudinal direction and comprising a plurality of at least two alternating magnetic pole pairs; and
wherein the position sensor device is movable in the longitudinal direction, at a nonzero distance from the magnetic source.

14. The magnetic position sensor system according to claim 13, wherein the substrate of the sensor device is oriented orthogonal to the orientation of the remanent magnetic field inside the magnetic source, and the second direction is oriented perpendicular to the substrate; or
wherein the substrate of the sensor device is oriented parallel to the orientation of the remanent magnetic field inside the magnetic source, and the second direction is oriented parallel to the substrate.

15. The magnetic position sensor system according to claim 10, further comprising a second processor communicatively connected to the position sensor device, and configured for performing one of the following:
i) receiving the first angle, and receiving the second angle, and comparing the first and second angle to detect an error;
ii) receiving the first angle, and receiving a diagnostic signal indicative of an error.

16. The position sensor device according to claim 1, wherein the second signal comprises a diagnostic signal derived from a comparison of the first angle and said second angle.

17. The position sensor device according to claim 1, wherein the second signal comprises the second angle.

18. A method of determining a linear or angular position, based on signals obtained from three magnetic sensors, spaced apart along a first direction, and capable of measuring at least two orthogonal magnetic field components; the method comprising the following steps:
a) determining a first and a second difference of signals provided by the first and the third sensor;
b) determining a first angle based on the first and second difference and outputting the first angle as a first signal;
c) determining a third and a fourth difference of signals provided by the second sensor and one of the first and the third sensor;
d) determining a second angle based on the third and the fourth difference; and
e) outputting a second signal based on said second angle.

19. The method according to claim 18, further comprising comparing the first angle and the second angle, wherein the second signal comprises a diagnostic signal derived from the comparison of the first angle and the second angle.

20. The method according to claim 18, wherein the second signal comprises the second angle.

* * * * *